(12) United States Patent
Georgiev

(10) Patent No.: US 9,665,409 B2
(45) Date of Patent: May 30, 2017

(54) METHODS AND APPARATUS FACILITATING ACCESS TO STORAGE AMONG MULTIPLE COMPUTERS

(71) Applicant: Citrix Systems, Inc., Fort Lauderdale, FL (US)

(72) Inventor: Ivan I. Georgiev, Sofia (BE)

(73) Assignee: Citrix Systems, Inc., Fort Lauderdale, FL (US)

(*) Notice: Subject to any disclaimer, the term of this patent is extended or adjusted under 35 U.S.C. 154(b) by 404 days.

(21) Appl. No.: 14/287,326

(22) Filed: May 27, 2014

(65) Prior Publication Data

US 2014/0359182 A1 Dec. 4, 2014

Related U.S. Application Data

(60) Provisional application No. 61/828,338, filed on May 29, 2013.

(51) Int. Cl.
  *G06F 13/24* (2006.01)
  *G06F 9/52* (2006.01)
  *G06F 13/26* (2006.01)
  *G06F 9/48* (2006.01)

(52) U.S. Cl.
  CPC .............. *G06F 9/52* (2013.01); *G06F 9/4812* (2013.01); *G06F 13/24* (2013.01); *G06F 13/26* (2013.01)

(58) Field of Classification Search
  None
  See application file for complete search history.

(56) References Cited

U.S. PATENT DOCUMENTS

| | | | |
|---|---|---|---|
| 6,909,691 B1 | 6/2005 | Goyal et al. | |
| 7,602,774 B1 | 10/2009 | Sundaresan et al. | |
| 8,387,066 B1* | 2/2013 | Becher | G06F 9/4881 709/223 |
| 8,473,566 B1 | 6/2013 | Cardente et al. | |
| 8,918,566 B2 | 12/2014 | Padala et al. | |
| 2004/0160446 A1* | 8/2004 | Gosalia | G06F 9/4843 345/503 |
| 2006/0195508 A1* | 8/2006 | Bernardin | G06F 9/505 709/203 |
| 2011/0107334 A1* | 5/2011 | Kapoor | G06F 9/4843 718/100 |

(Continued)

*Primary Examiner* — Henry Tsai
*Assistant Examiner* — Aurangzeb Hassan
(74) *Attorney, Agent, or Firm* — BainwoodHuang

(57) ABSTRACT

Multiple applications communicate tasks to a collective arbitrator. The arbitrator submits the tasks to a shared resource (work processor) for execution. For each segment of multiple segments of time, the arbitrator tracks consumption of time associated with execution of pending tasks submitted to the shared resource for execution on behalf of multiple applications. The arbitrator further controls subsequent submission of additional sets of one or more tasks to the shared resource for each of the multiple applications over successive segments of time depending on how much time it took the shared resource to perform the submitted tasks in one or more prior time segments. Tracking an amount of time that it takes the shared resource to execute submitted tasks and using such information to control future submission of tasks ensures that each of the task generating resources, over time, is provided fair use of the shared resource.

21 Claims, 15 Drawing Sheets

(56) References Cited

U.S. PATENT DOCUMENTS

2011/0246994 A1* 10/2011 Kimbrel .............. G06F 9/5027
  718/102
2015/0293776 A1* 10/2015 Persson .............. G06F 9/45558
  718/1

* cited by examiner

ENVIRONMENT
700

METHODS AND APPARATUS FACILITATING ACCESS TO STORAGE AMONG MULTIPLE COMPUTERS

RELATED APPLICATIONS

This application is related to and claims the benefit of earlier filed U.S. Provisional Patent Application Ser. No. 61/828,338 entitled "QUALITY OF SERVICE (QOS) ARBITER,", filed on May 29, 2014, the entire teachings of which are incorporated herein by this reference.

BACKGROUND

A service provider (such as a work processor) usually is limited in regard to the quantity of requests it can service in a period of time. In case of multiple consumers (applications) requesting simultaneous execution of services with respect to the work processor, a need arises to give priority to one or more of the applications without resorting to denial of service or starvation for the rest of the applications.

An example of this concept is arbitrating the access of multiple applications to a shared storage device. All storage devices have a technological limitation in regard to how many or how large Input/Output requests they can complete within a given period of time. When multiple applications have access to a shared storage, some of the applications' requests may need to be executed with higher priority than others. Usually neither the applications nor the storage device implement a system that provides arbitration of submitting requests to a shared work processor. This may result in unfair usage of the shared work processor.

BRIEF DESCRIPTION OF EMBODIMENTS

Conventional techniques of sharing use of a work processor suffer from deficiencies. For example, as discussed above, multiple users may compete amongst each other for use of the shared work processor, resulting in unfair usage if the requesting resources are not controlled. Worse yet, overloading a work processor with too many processing requests at the same time may cause a system failure or inefficient handling of work tasks.

In contrast to conventional techniques, embodiments herein include providing an arbitration-processing layer between applications and a respective shared work processor that arbitrates use of a shared work processor based on a pre-established application priority. In addition to providing fair use amongst the multiple applications, the arbitration-processing layer as described herein prevents overloading of the shared work processor.

More specifically, embodiments herein include an arbitrator resource. The arbitrator resource can be centrally located or be a distributed system including multiple arbitrator resources that communicate with each other to perform logical arbitration operations.

In one embodiment, the arbitrator resource partitions time into contiguous time segments (such as substantially equal durations of time). Multiple applications communicate work tasks to the logical arbitrator resource. As its name suggests, to ensure fair use of the shared resource during high demand in which the work processor is not able to keep up with processing all generated I/O task requests, the arbitrator resource selectively forwards the work tasks to the shared resource (such as a work processor) for execution in accordance with priority settings of resources generating the tasks to be executed.

In one embodiment, for each segment of time, the arbitrator resource tracks consumption of time associated with execution of pending tasks submitted to the shared resource for execution on behalf of the different resources. As an example, for each time segment, the arbitrator resource keeps track of time consumed by a shared resource to execute a first resource's (e.g., first application's) submitted tasks; the arbitrator resource keeps track of time consumed by a shared resource to execute a second resource's (e.g., second application's) submitted tasks; and so on. The arbitrator resource controls subsequent submission of additional sets of one or more tasks to the shared resource for each of the multiple applications over successive segments of time depending on how much of the shared processor resource's time was consumed by each of the applications in one or more prior time segments.

In one embodiment, tracking an amount of time that it takes the shared resource to execute submitted tasks and using such information to control future submission of tasks ensures that each of the task generating resources, over time, is provided fair use of the shared resource. For example, if the arbitrator resource detects that the amount of time that the shared resource spends performing tasks associated with a first application (first resource) is above a desired amount for the first resource during a first time segment (interval), the arbitrator resource reduces and/or delays an amount of tasks submitted on behalf of the first resource on a subsequent work time segment. If the arbitrator resource detects that the amount of time that the shared resource spends performing tasks associated with a second application is below a desired amount for the second resource during the first time segment (because consumption by the first resource was too high), the arbitrator resource increases submission of tasks on behalf of the second resource in one or more subsequent cycles. In this way, each of the task requesting resources is afforded an appropriate amount of consumption time or use of the shared resource in accordance with different access levels (or priorities).

The arbitration process as described herein can be configured to control future consumption of processing provided by the shared work resource to the different applications in any suitable manner. For example, in one embodiment, the arbitrator resource limits a number of simultaneous tasks requests that can be submitted for each of the applications in a given time segment. Additionally, the arbitrator resource can be configured to delay submission of one or more tasks to the shared resource during a given time segment. Delaying submission of tasks reduces how much time is allocated to a given application to execute respective I/O task requests. Conversely, submitting I/O task requests earlier in a time segment or submitting a greater number of simultaneous tasks in a respective time segment for a corresponding application increases an amount of time used by a work processor to execute the corresponding application's tasks.

Embodiments herein are useful over conventional techniques because it is not necessary for the arbitrator resource to know precisely how much processing time will be required to perform each of the submitted tasks to ensure fairness amongst multiple applications. In other words, it may be unknown by the arbitrator resource exactly how long each submitted task will take the shared resource to execute. Tracking a time between submission of a respective task and completion of execution of each respective task by the shared resource enables the arbitrator resource to determine how much processing time is dedicated to perform submitted tasks for each of the different task requesting applications. As previously discussed, the collective arbitration process (such as one or more arbitrator resources) controls submission of the I/O task requests for the different applications or users such that the These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware (such as in wireless gateway hardware), cause the computer processor hardware of the system to: partitioning time into contiguous time segments; submitting tasks from multiple resources to a shared resource for execution; within each time segment of the contiguous time segments, tracking time associated with execution of the tasks submitted to the shared resource for execution; and controlling subsequent submission of additional tasks to the shared resource for each of the multiple resources depending on the tracked time of the submitted tasks.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a wireless gateway configured to provide different levels of network access to users in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
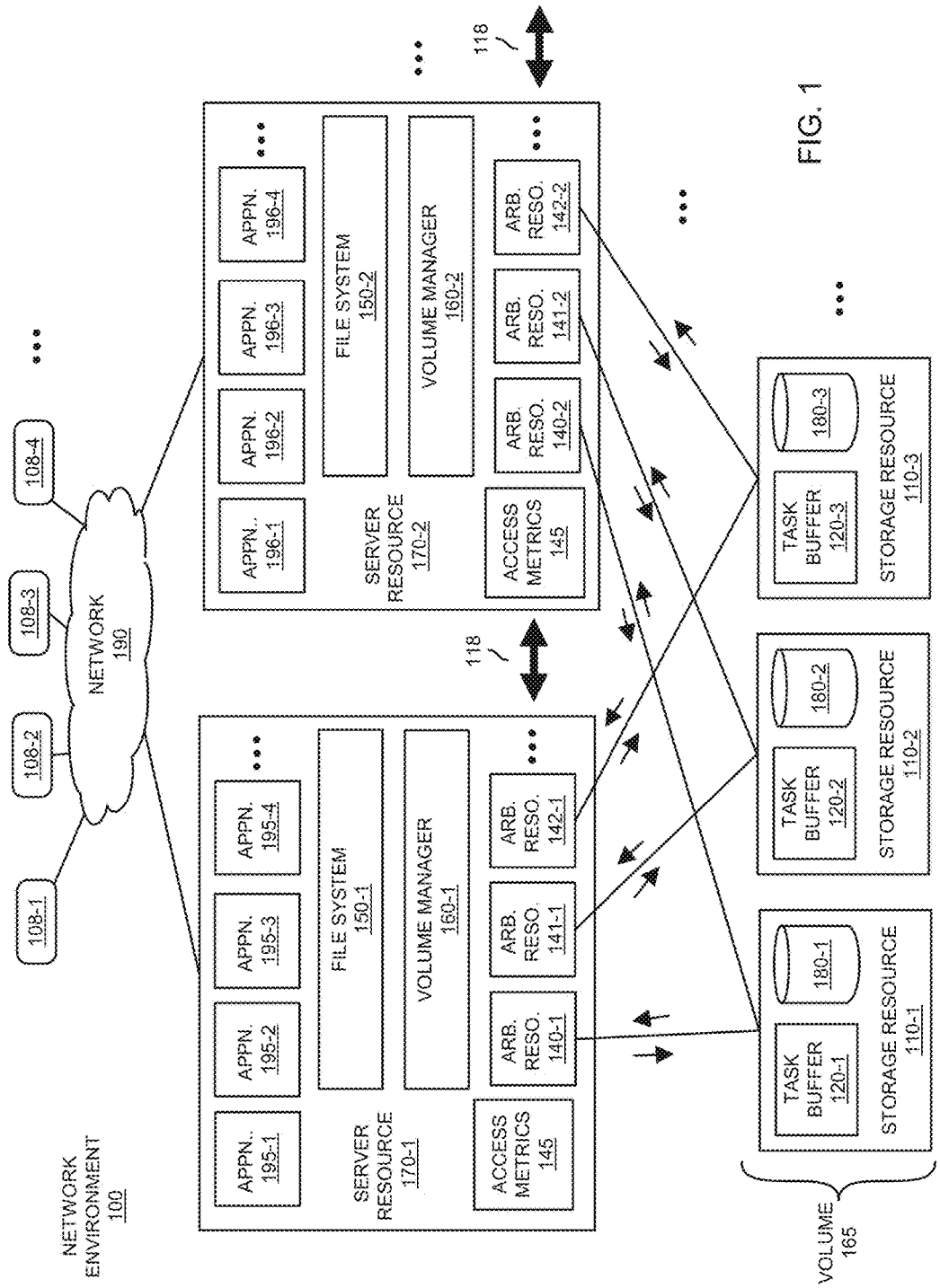
FIG. 1 is an example diagram illustrating an arbitrator resource disposed in a computer network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In general, embodiments herein include a method of arbitrating access to a service provider from multiple consumers based on pre-established consumer priority. A service provider (work processor) usually is limited in regard to the quantity of overall requests it can serve in a period of time. In a case of multiple consumers (applications) simultaneously requesting services, a need arises to give priority to one or more of the applications without resorting to denial of service or starvation for the rest of the applications. In other words, each of multiple applications should be granted an allocated share of available task consumption time.

An example of this concept is arbitrating the access of multiple applications to a resource such as a shared storage device. The arbitration as described herein can be applied at any resource level such as a file, a storage device, etc.

All storage devices have a technological limitation in regard to how many or how large Input/Output requests they can complete for a period of time. When multiple applications have access to shared storage, some of the applications' requests may need to be executed with higher priority than others. According to conventional systems, usually neither the applications nor the storage device implement a system that provides arbitration amongst users. This can result in unfair use by one or more applications at the expense of others. Embodiments herein include an opaque arbitration layer between applications and a respective work processor. The arbitration layer provides arbitration based on pre-established application priority.

Now, more specifically, FIG. 1 is an example diagram illustrating an arbiter (one or more arbitrator resources) disposed in a computer network according to embodiments herein.

As shown, network environment 100 of the present example includes multiple users 108 (user 108-1, user 108-2, user 108-3, user 108-4, . . . ). Each of the users 108 can include a corresponding computer resource (client device) to communicate over network 190 to a respective one or more server resources 170 (server resource 170-1, server resource 170-2, . . . ). Server resources 170 have access to storage resources 110.

In one embodiment, the server resource 170-1 executes corresponding one or more applications 195 (such as application 195-1, the application 195-2, application 195-3, application 195-4, . . . ) on behalf of users 108; the server resource 170-2 executes corresponding one or more applications 196 (application 196-1, the application 196-2, application 196-3, application 196-4, . . . ) on behalf of users 108, and so on.

Assume in this example that server resource 170-1 executes application 195-1 on behalf of the user 108-1; server resource 170-2 executes application 196-1 on behalf of the user 108-1. Each of these applications generates one or more work tasks for execution by a respective shared resource. In this example embodiment, the shared resource represents a storage resource 110-1. The applications generate work tasks (I/O requests) for execution by a storage resource 110-1.

In one embodiment, a combination of storage resources 110-1, 110-2, 110-3, etc., represents a volume 165. The applications generate work tasks for execution by a respective storage resource in the volume 165.

In one embodiment, each storage resource includes multiple arbitrator resources. For example, server resource 170-1 includes arbitrator resource 140-1, arbitrator resource 141-1, arbitrator resource 142-1, etc. Server resource 170-2 includes arbitrator resource 140-2, arbitrator resource 141-2, arbitrator resource 142-3, etc.

As their names suggest, arbitrator resources 140 (such as arbitrator resource 140-1 and arbitrator resource 140-2) control forwarding of work tasks to a respective storage resource. For example, arbitrator resource 140-1 in server resource 170-1 controls the forwarding of work tasks from any of applications 195 to storage resource 110-1; arbitrator resource 140-2 in server resource 170-2 controls the forwarding of work tasks from any of applications 196 to storage resource 110-1; and so on.

Further in this example embodiment, arbitrator resource 141-1 in server resource 170-1 controls the forwarding of work tasks from any of applications 195 to storage resource 110-2; arbitrator resource 141-2 in server resource 170-2 controls the forwarding of work tasks from any of applications 196 to storage resource 110-2; and so on.

Yet further in this example embodiment, arbitrator resource 142-1 in server resource 170-1 controls the forwarding of work tasks from any of applications 195 to server resource 110-1; arbitrator resource 142-2 in server resource 170-2 controls the forwarding of work tasks from any of applications 196 to storage resource 110-2; and so on.

Thus, in one embodiment, each of the server resources 170-1, 170-2, etc., includes a corresponding arbitrator resource in which to control a flow of work task requests to a corresponding storage resource in the volume 165.

As further shown, embodiments herein include connectivity 118 (such as one or more network communication links) enabling the respective arbitrator resources to communicate with each other such that the arbitrator resources communicate and work together to forward requested tasks to a respective storage resource. For example, via connectivity 118, arbitrator resource 140-1 is communicatively coupled to any other arbitrator resources such as arbitrator resource 140-2 having access to storage resource 110-1, etc.; via connectivity 118, arbitrator resource 141-1 is communicatively coupled to any other arbitrator resources such as arbitrator resource 140-2 having access to storage resource 110-2; arbitrator resource 142-1 is communicatively coupled to any other arbitrator resources such as arbitrator resource 142-2 having access to storage resource 110-3; and so on.

Via communications over connectivity 118, the arbitrator resources keep track of forwarding of tasks by other applications to each of the storage resources 110.

In this example embodiment, note that each server resource includes a respective file system and volume manager to facilitate forwarding of task requests to the appropriate arbitrator resource. For example, assume that user 108-1 causes execution of application 195-1 on server resource 170-1. Assume further that application 195-1 generates a request to access data stored in repository 180-1 of storage resource 110-1. In such an instance, the application 195-1 forwards the I/O task requests to file system 150-1.

File system 150-1, in turn, forwards the I/O task requests to volume manager 160-1. Volume manager 160-1 forwards the I/O task requests to the appropriate arbitrator resource. In this example, because the I/O task requests are directed to storage resource 110-1, the volume manager 160-1 forwards the I/O task requests generated by application 195-1 to arbitrator resource 140-1. As previously discussed, arbitrator 140-1 controls the flow of the I/O task requests to storage resource 110-1.

Assume further that user 108-2 causes execution of application 196-1 on server resource 170-1. Application 196-1 also generates requests to perform operations with respect to data stored in repository 180-1 of storage resource 110-1. In such an instance, the application 196-1 forwards the I/O task requests to file system 150-2 of server resource 170-2. File system 150-2, in turn, forwards the I/O task requests to volume manager 160-2. Volume manager 160-2 forwards the I/O task requests to the appropriate arbitrator resource. In this example, because the I/O task requests are directed to storage resource 110-1, the volume manager 160-2 forwards the I/O task requests from generated by application 196-1 to arbitrator resource 140-2. As previously discussed, arbitrator resource 140-2 controls the flow of the I/O task requests to storage resource 110-1.

In one embodiment, the arbitrator resources 140-1 and 140-2 enable the respective applications 195-1 and 196-1 to freely forward the I/O task requests to storage resource 110-1 for storage in task buffer 120-1. However, the arbitrator resources monitor forwarding of I/O task requests to storage resource 110-1 by the different applications. In certain instances, the arbitrator resources may detect that application 195-1 is sending so many requests to the storage resource 110-1 that application 196-1 does not receive a fair share of processing capacity associated with storage resource 110-1. In such an instance, to provide fairness amongst users, the arbitrator resources 140-1 and 140-2 collectively limit forwarding of I/O task requests to storage resource 110-1 in accordance with access metrics 145.

In accordance with further embodiments, access metrics 145 indicate a priority of forwarding I/O task requests for each of the different users 108. Recall that the arbitrator resources assigned to control access to a respective storage resource communicate with each other via respective connectivity 118. Accordingly, each of the arbitrator resources is aware of how many I/O task requests are submitted by other arbitrator resources.

In still further embodiments, the arbiter resource 140 employs a time distribution strategy within equal sized time intervals. Each application (in certain instances, denoted by α) is granted a certain amount of time (time loan) for each interval (time segment) in which it can perform so-called I/O task requests or Work Units (WUs; a single work unit will be denoted by the letter ϵ or E). Whenever a given application exhausts its time limit for the current interval the corresponding arbiter resource blocks (delays submission of) additional work requests from the arbitrator resource to the shared resource to prevent the given application from consuming to much processing time provided by the shared resource (such as a storage resource). The new work requests remain blocked until enough of the application's outstanding work tasks has been completed, or until a new interval starts in which case the application again receives a new time loan for the interval. In one embodiment, the time distribution is determined based on application priority points assigned by the user and the current workload. The arbiter gathers statistical data for a certain number of past intervals and performs redistribution when a change of workload is detected.

Consumed Time

In accordance with other embodiments, the arbiter divides time into equal sized intervals (i; interval length denoted by μ). For each interval, and for each application, the time consumed by the WUs (Work Units) performed in that interval (consumed time–$t_c$) is calculated. WUs for each interval (the set of WUs for an interval denoted by E) fall into four categories:
  1. WUs that started and completed within the interval's time frame. The consumed time for these WUs is: $t_c(\epsilon)=\text{time}_{end}(\epsilon)-\text{time}_{start}(\epsilon)$.
  2. WUs that started within the interval's time frame, but did not complete by the interval's expiration time. Their consumed time is: $t_c(\epsilon)=\text{time}_{end}(i)-\text{time}_{start}(\epsilon)$.
  3. WUs that had started in a previous interval and complete within the current interval's time frame. Their consumed time is: $t_c(\epsilon)=\text{time}_{end}(\epsilon)-\text{time}_{start}(i)$.
  4. WUs that had started in a previous interval and are still not completed by the end of the interval's time frame. Their consumed time is: $t_c(\epsilon)=\mu$.

For each interval the interval consumed time sum is:

$$t_c(E) = \sum_{\varepsilon \in E} t_c(\varepsilon).$$

The arbiter also keeps statistical data for a fixed number of past intervals. The number of past intervals is denoted by S, the sets of WUs for the past S intervals are denoted by $E_1$, $E_2$, . . . , $E_s$. Initially $E_j=\emptyset$, $j\epsilon[1 \ldots S]$. After an interval elapses, the arbiter assigns $E_{j+1}=E_j$, $j\epsilon[2 \ldots S]$ and $E_1=E$. The statistical intervals are used in calculating the average interval consumed time ($t_{avg}$):

$$t_{avg} = \frac{\sum_{j=1}^{S} t_c(E_j)}{S}.$$

An application is considered an active application when $t_{avg}(\alpha)>0$. The set of active applications will be denoted by A, i.e. $\alpha \epsilon A \Leftrightarrow t_{avg}(\alpha)>0$. When all the outstanding WUs of an application have been completed and it remains idle for a period of time equal to S×μ it becomes inactive.

Figure 2:
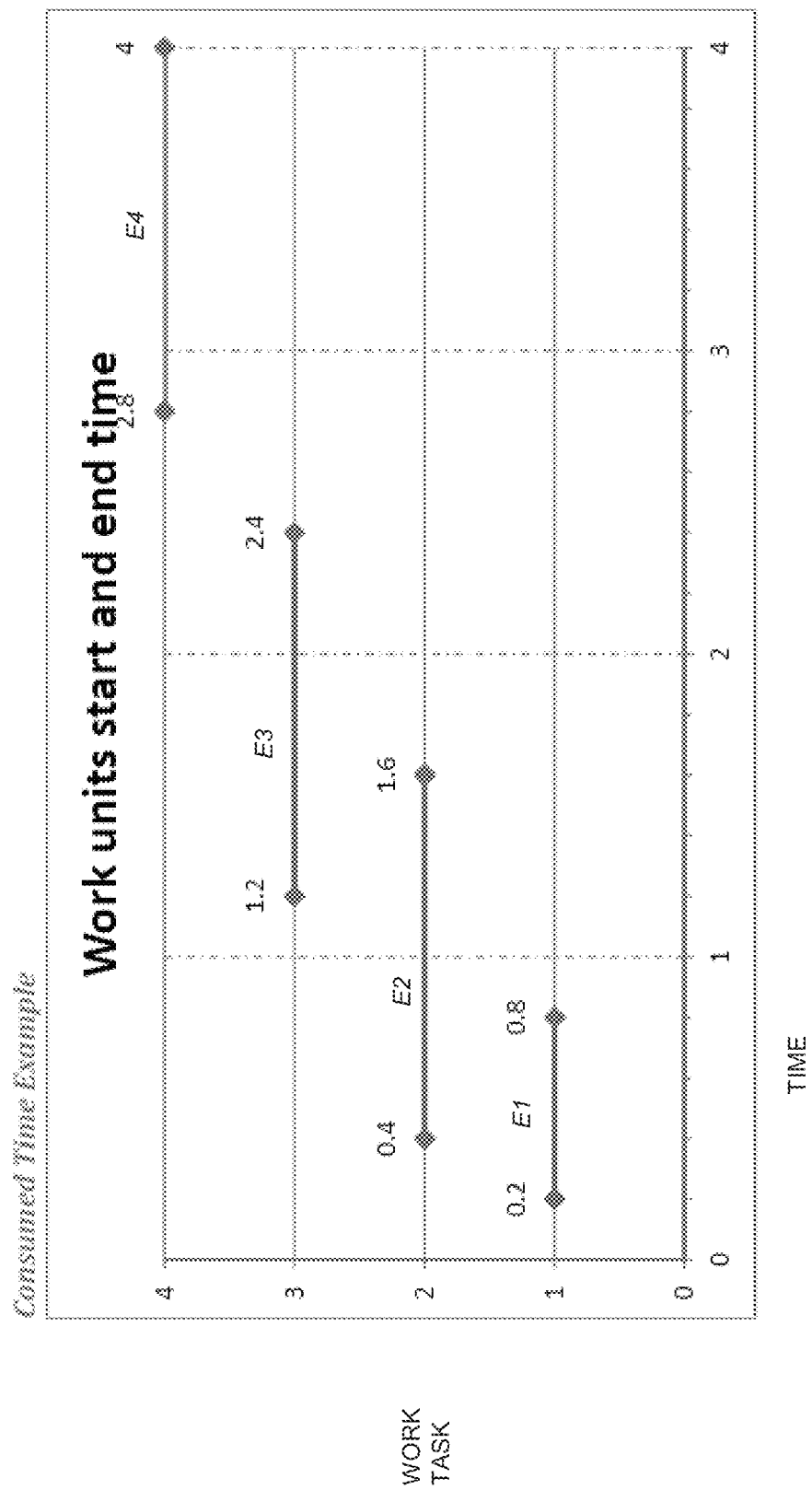
FIG. 2 is an example diagram illustrating tracking consumption of time to execute tasks according to embodiments herein.

FIG. 2 is an example diagram illustrating tracking consumption of time to execute tasks according to embodiments herein.

As previously discussed, the arbitrator resource forwards the respective work tasks to the appropriate storage resource for execution. The time required to execute different I/O task requests can vary.

Assume in this example that the arbitrator resource 140-1 submits work units E1, E2, E3, and E4 in the intervals as shown in FIG. 2. In one embodiment, the arbitrator resource keeps track of the time in each interval via a time tracker. For example, the arbitrator resource 140-1 submits the work unit E1 to the storage resource 110-1 at time=0.2. The storage resource 110-1 stores the work unit E1 in task buffer 120-1 for execution. Subsequent to executing the work unit E1 (such as modifying data stored in repository 180-1 as specified by the work unit E1), the storage resource 110-1 notifies the arbitrator resource 140-1 (at time=0.8) that the work unit E1 has been executed. The arbitrator resource 140-1 keeps track of the start time (0.2) and complete time (0.8).

Assume further in this example that the arbitrator resource 140-1 submits the work unit E2 to the storage resource 110-1 at time=0.4. The storage resource 110-1 stores the work unit E2 in task buffer 120-1 for execution. Subsequent to executing the work unit E2 (such as modifying data stored in repository 180-1 as specified by the work unit E2), the storage resource 110-1 notifies (at time=1.6) the arbitrator resource 140-1 that the work unit E2 has been executed. The arbitrator resource 140-1 keeps track of the start time (0.4) and complete time (1.6).

Assume further in this example that the arbitrator resource 140-1 submits the work unit E3 to the storage resource 110-1 at time=1.2. The storage resource 110-1 stores the work unit E3 in task buffer 120-1 for execution. Subsequent to executing the work unit E3 (such as modifying data stored in repository 180-1 as specified by the work unit E3), the storage resource 110-1 notifies (at time=2.4) the arbitrator resource 140-1 that the work unit E3 has been executed. The arbitrator resource 140-1 keeps track of the start time (1.2) and complete time (2.4).

Assume further in this example that the arbitrator resource 140-1 submits the work unit E4 to the storage resource 110-1 at time=2.8. The storage resource 110-1 stores the work unit E4 in task buffer 120-1 for execution. Subsequent to executing the work unit E4 (such as modifying data stored in repository 180-1 as specified by the work unit E4), the storage resource 110-1 notifies (at time=4.0) the arbitrator resource 140-1 that the work unit E4 has been executed. The arbitrator resource 140-1 keeps track of the start time (2.8) and complete time (4.0).

Assume in this example embodiment that a respective application has performed 4 work units (such as E1, E2, E3, and E4) within a period of time equal to $4\mu$ (i.e., 4 time segments including: the first time segment between 0 and 1, the second time segment between 1 and 2, the third time segment between 2 and 3, and the fourth time segment between 3 and 4).

As shown, work unit (I/O task request) $\epsilon_1$ (i.e., E1) is started and completed within interval $i_1$. The other WUs span multiple intervals. That is, one portion of the work unit is performed in a first time segment; a second portion of the work unit is performed in a second time segment. For $i_1$ (time segment between 0 and 1), work unit $\epsilon_1$ falls into category 1; and $\epsilon_2$ (i.e., E2) falls into category 2. For $i_2$ work unit $\epsilon_2$ falls into category 3 and for $i_4$ we have $\epsilon_4$ (i.e., E4) which falls into category 4. So for the corresponding intervals the consumed time $t_c(i)$ by a respective application (such as application 195-1 in this example) submitting the four work units will be:

$t_c(i_1)=(0.8-0.2)+(1-0.4)=1.2$ which represents the time consumed by respective storage resource 110-1 on behalf of application 195-1 to execute all of work unit E1 and the first portion of E2 in the first interval of time between 0 and 1;

$t_c(i_2)=(1.6-1)+(2-1.2)=1.4$, which represents the time consumed by respective storage resource 110-1 on behalf of application 195-1 to execute the last portion of E2 and the first portion of E3 in the first interval of time between 1 and 2;

$t_c(i_3)=(2.4-2)+(3-2.8)=0.6$, which represents the time consumed by respective storage resource 110-1 on behalf of application 195-1 to execute the last portion of E3 and the first portion of E4 in the first interval of time between 2 and 3;

$t_c(i_4)=1$, which represents the time consumed by respective storage resource 110-1 on behalf of application 195-1 to execute the last portion of E4 in the fourth interval between 3 and 4;

Let S=4, then $$t_{avg} = \frac{1.2+1.4+0.6+1}{4} = 1.05$$

Figure 3:
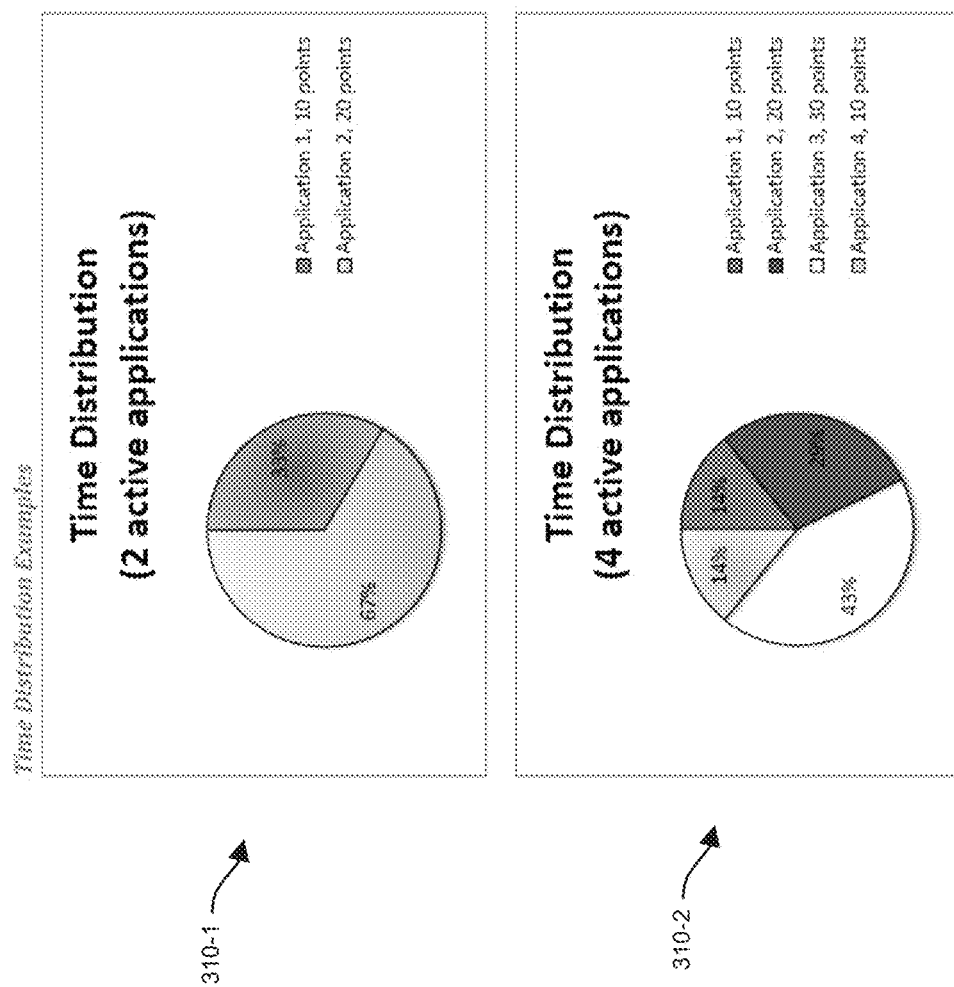
FIG. 3 is an example diagram illustrating apportioning consumption of time to each of multiple applications according to embodiments herein.

FIG. 3 is an example diagram illustrating apportioning consumption of time to each of multiple applications according to embodiments herein.

As previously discussed, each respective arbitrator resource can be configured to keep track of time consumed to execute respective one or more submitted work units on behalf of the applications. In accordance with further embodiments, each of the respective storage resources has only a finite amount of time to execute work units (I/O task requests) from the applications. As shown in FIG. 3, the different applications can be allocated different weights values (points). Assignment of different point values to the applications apportions different amounts of a storage resource's available processing time to the different applications (and/or uses) submitting tasks.

For example, as specified by graph 310-1, assume that application #1 has been assigned 10 points and application #2 has been assigned 20 points and that these are the only two applications that are accessing storage resource 110-1. In such an instance, via normalization, application #1 is allocated 33% of the storage resource's available processing time to execute I/O task requests generated by application #1; application #2 is allocated 67% of the storage resource's available processing time to execute I/O task requests generated by application #2.

As further discussed below, the arbitrator resources control a flow of the I/O task requests from application #1 and application #2 to the storage resource 110-1 such that application #1 consumes 33% of storage resource's available processing time and application #2 consumed 67% of the storage resource's available processing time.

In accordance with another embodiment as specified by graph 310-2, assume that application #1 has been assigned 10 points, application #2 has been assigned 20 points, application #3 has been assigned 30 points, application #4 has been assigned 10 points, and that these are the only four applications that are accessing storage resource 110-1. In such an instance, via normalization, application #1 is allocated 14% (10/70) of the storage resource's available processing time to execute I/O task requests generated by application #1; application #2 is allocated 29% (20/70) of the storage resource's available processing time to execute I/O task requests generated by application #2, application #3 is allocated 43% (30/70) of the storage resource's available processing time to execute I/O task requests generated by application #3; application #4 is allocated 14% (10/70) of the storage resource's available processing time to execute I/O task requests generated by application #1. In such an instance, the corresponding arbitrator resources controls a flow of the I/O task requests from the competing application to the storage resource 110-1 such that application #1 consumes 14% of storage resource's available processing time; application #2 consumes 29% of the storage resource's available processing time; application #3 consumes 43% of the storage resource's available processing time; and application #4 consumes 14% of the storage resource's available processing time.

Time Distribution Amongst Multiple Applications Competing to Submit I/O Task Requests to a Same Storage Resource Statistical data gathered by the arbiter for the interval consumed time $t_{avg}(\alpha)$, together with user-defined application priority points (denoted by p) is used in the time distribution formula. Allocated application time ($t_a$) is calculated as follows:

$$t_a(\alpha) = \frac{p(\alpha)}{\sum_{\alpha \in A} p(\alpha)} \times \sum_{\alpha \in A} t_{avg}(\alpha)$$

It is evident that $$\frac{t_a(\alpha_1)}{t_a(\alpha_2)} = \frac{p(\alpha_1)}{p(\alpha_2)},$$

i.e. application with higher value for application points will have more distributed time. Thus, allocation of respective points to a user (or application) provides the arbitrator resource a baseline of how to control submission of I/O task requests to a storage resource for execution. As mentioned above, the higher the number of points assigned to an application, the more available processing power associated with storage resource will be allocated for use by the application. The above version of the formula is simplified. The detailed version of the formula, which will be discussed later, utilizes adjusted values for $p(\alpha)$ and also an adaptive growth factor that compensates for possible fluctuations in the work processor's processing speed.

Employing Application Allocated Time

The arbiter (respective arbitrator resource) uses the $t_a$ value to distribute access time to the work processor. The higher the value, the more time per interval will be available to an application to perform WUs. For each application there is an associated value: time balance ($t_b$) which determines whether the application's WUs will be passed to the work processor. The arbiter intercepts all work requests issued by an application. Every time a new work request is intercepted, the arbiter checks $t_b(\alpha)$ and if it is positive, the WU will be passed to the work processor for execution, otherwise the arbiter queues the WU in a per-application WU queue (Q) for later execution. For each application the arbiter also keeps the number of WUs passed to the work processor, but not yet completed (outstanding WU count q).

In summary, the following data is kept by the arbiter for each application: $t_a(\alpha)$, $t_b(\alpha)$, $q(\alpha)$ and $Q(\alpha)$.

Initially $t_b(\alpha)=t_a(\alpha)$. The following events can modify $t_b(\alpha)$:

The application issues a new WU request. The following steps are executed:
1. The WU is tagged with a specific application identifier, unique for each application.
2. If $t_b(\alpha) \leq 0$, go to step 6.
3. $t_b(\alpha)=t_b(\alpha)-[\text{time}_{end}(i)-\text{time}_{current}]$.
4. Increment $q(\alpha)$.
5. Pass the WU to the work processor for execution.
6. End.

The work processor indicates that a WU which had been previously passed to it for execution is now complete (i.e. the work processor indicates WU completion). The following steps are executed:
1. Extract the WU tag and identify the corresponding application.
2. $t_b(\alpha)=t_b(\alpha)+[\text{time}_{end}(i)-\text{time}_{current}]$
3. Decrement $q(\alpha)$.
4. Execute the Drain application WU queue procedure which consists of the following steps:
   I. If $t_b(\alpha)>0$ and $Q(\alpha) \neq \emptyset$ proceed to step II), otherwise go to step V).
   II. $t_b(\alpha)=t_b(\alpha)-[\text{time}_{end}(i)-\text{time}_{current}]$.
   III. Increment $q(\alpha)$.
   IV. Remove one WU from the queue and pass it to the work processor for execution. Go to step I).
   V. End.
5. End.

An interval elapses. For each application the arbiter performs these steps:
1. $t_b(\alpha)=t_b(\alpha)-q(\alpha)\times\mu+t_a(\alpha)$
2. Execute the Drain application WU queue procedure.
3. End.

In one embodiment, the arbiter performs time re-distribution in response to a change of the workload. For each application, the arbiter updates $t_a(\alpha)$ with the value calculated previously with the time distribution formula. Then if $t_b(\alpha)>0$ the following formula is applied:

$$t_b(\alpha)=t_a(\alpha)-q(\alpha)\times[\text{time}_{end}(i)-\text{time}_{current}]$$

It is evident that, within a particular interval, an application with higher time balance will be able to perform more and/or longer WUs than an application with lower time balance. However, since $t_b(\alpha)$ is increased with $t_a(\alpha)$ at the beginning of each interval, applications with higher $t_a(\alpha)$ will be able to perform more and/or longer WUs in the long run (consecutive intervals).

Figure 4:
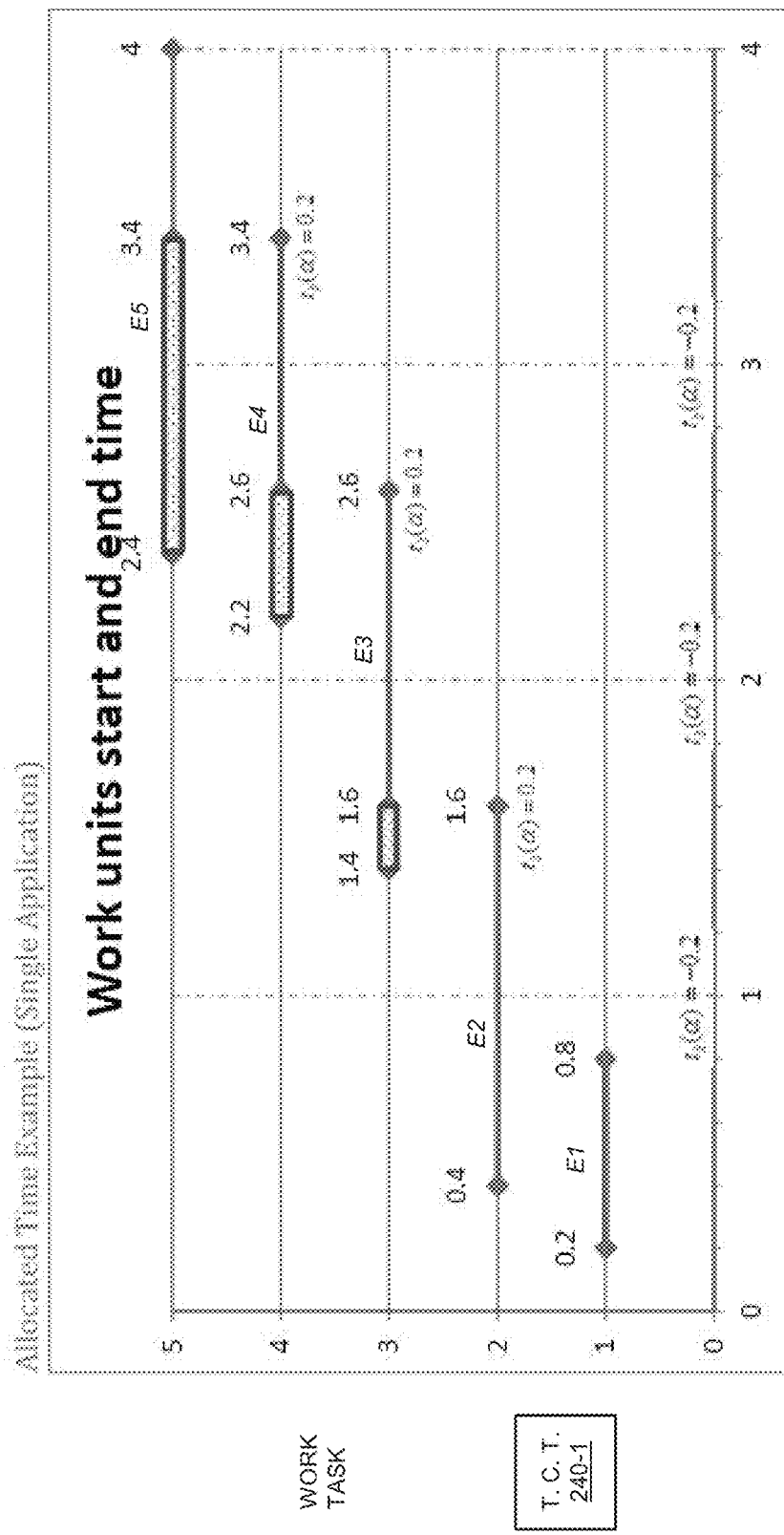
FIG. 4 is an example diagram illustrating time consumption tracking and corresponding arbitration according to embodiments herein.

FIG. 4 is an example diagram illustrating time consumption tracking and corresponding arbitration according to embodiments herein.

Let $t_a(\alpha)=1$. The values for $t_b$ (time balance) in the chart 410 are at the end of each interval, after adding $t_a$. Also initially we have $t_b=t_a$. At time=0.0, the arbitrator resource 140-1 sets $t_a=1$.

At time point 0.2, the arbitrator resource 140-1 produces the time balance value for application 195-1 as $t_b(\alpha)=1-(1-0.2)=0.2$ and $q(\alpha)=1$. The arbitrator resource 140-1 submits task E1 for execution at time 0.2.

Then at time point 0.4, the arbitrator resource 140-1 receives task E2 and schedules the work task E2 for execution, because $t_b(\alpha)>0$. The time balance value $t_b$ at time 0.4 changes to $t_b(\alpha)=0.2-(1-0.4)=-0.4$ and $q(\alpha)=2$.

At time point 0.8 we have $t_b(\alpha)=-0.4+(1-0.8)=-0.2$ and $q(\alpha)=1$, this indicates that at time 0.8, the application 195-1 has used up all of its time (1 unit) allotted for the first time segment.

At time point 1.0, the time the value 1 is added to the time balance so that time balance value is $t_b(\alpha)=-0.2-q(\alpha)\times\mu+t_a(\alpha)=-0.2-1+1=-0.2$. The -0.2 value indicates that the application 195-1 over consumed its allotted amount of work time (of 1) for the first time segment.

At time point 1.4, the arbitrator resource 140-1 receives a new work unit E3 from application 195-1 and stores it in a queue. Since at time 1.4, $t_b(\alpha)<0$, the arbitrator resource 140-1 cannot yet pass it for execution by the processor of storage resource 110-1.

At time point 1.6, the arbitrator resource 140-1 produces the time balance value $t_b(\alpha)=-0.2+(2-1.6)=0.2$ and $q(\alpha)=0$.

This means that the arbitrator resource 140-1 is greater than zero and that the arbitrator resource 140-1 may execute the Drain application WU queue procedure. At a time of submitting, the arbitrator resource 140-1 sets the time balance value $t_b(\alpha)=0.2-(2-1.6)=-0.2$ and $q(\alpha)=1$. However, the time between 1.4 and 1.6 for E3 will not participate in the calculation of $t_c(E_2)$ because this time had not been used by the processor, i.e. $t_c(E_2)=1$.

At time point 2.0, similar to time point 1.0, the arbitrator resource 140-1 produces the time balance value to be $t_b(\alpha)=-0.2$ and $q(\alpha)=1$. So when E4 and E5 are received from application 195-1 at respective times 2.2 and 2.4, these I/O task requests are stored in a respective queue of the arbitrator resource 140-1.

At time point 2.6, similar to time point 1.6, $t_b(\alpha)$ becomes positive and E4 can be removed from the arbitrator resource 140-1 queue and passed to the storage resource 110-1 for execution. Submission of the task E4 to the storage resource 110-1 causes $t_b(\alpha)$ to become negative again and thus E5 will not be started until time point 3.4 when task E4 gets completed by the processor.

In this manner, the arbitrator resource 140-1 limits and/or delays a number of I/O task requests that can be submitted by the application 195-1 to storage resource 110-1 for execution such that the storage resource 110-1 performs approximately one work unit associated with the application 195-1 per interval or time segment. If the amount of time consumed to execute the I/O task requests from a respective application exceeds a predetermined amount causing the time balance value to become negative, then the arbitrator resource 140-1 delays submitting future I/O task requests on behalf of the application. Control in this manner limits consumption to a selected value such one work unit per time segment.

Figure 5:
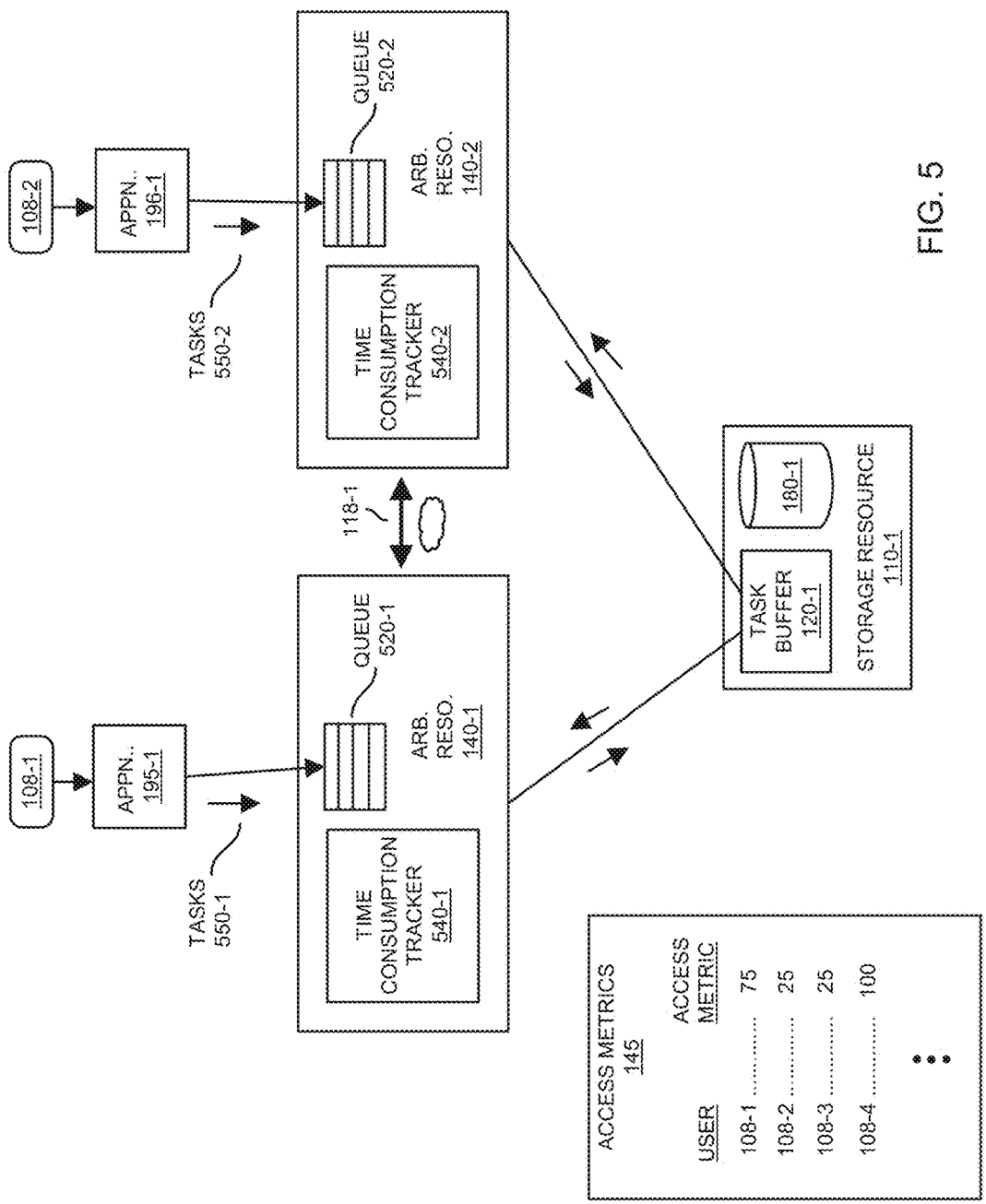
FIG. 5 is an example diagram illustrating multiple arbitrator resources and arbitration of executing work tasks for each of multiple applications according to embodiments herein.

FIG. 5 is an example diagram illustrating multiple arbitrator resources and arbitration of executing work tasks for each of multiple applications according to embodiments herein.

In this example embodiment, assume that both application 195-1 and application 196-1 each generate different sets of I/O task requests for submission to storage resource 110-1. Further assume that both application 195-1 and application 196-1 compete for use of available processing capability associated with storage resource 110-1.

In this example embodiment, the arbitrator resources 140-1 and 140-2 communicate with each other via connectivity 118 (such as via one or more network communication links) such that each of the applications 195-1 and 196-1 are able to use available processing capacity in accordance with the access metrics 145. For example, user 108-1 has been assigned an access metric having a magnitude of 75 points; user 108-2 has been assigned an access metric having a magnitude of 25 points.

Assuming that these are the only two users (and applications) competing for access to storage resource 110-1, the arbitrator resources 140-1 and 140-2 collectively control submission of the I/O task requests to storage resource 110-1 such that the application 195-1 is allowed up to use of 75% of the storage resource's 110-1 processing capability while application 195-2 is allowed up to use of 25% of the storage resource's 110-1 processing capability.

As further shown, application 195-1 forwards its I/O task requests 550-1 to arbitrator resource 140-1. Arbitrator resource 140-1 stores the submitted I/O task requests 550-1 from application 195-1 in queue 520-1. Arbitrator resource 140-1 includes time consumption tracker 540-1. As its name suggests, time consumption tracker 540-1 keeps track of time consumed by storage resource 110-1 to execute tasks 550-1 submitted by application 195-1 to storage resource 110-1. Consumption occurs between a time of submitting a task and a time of receiving notification that the task has been completed.

As further shown, application 196-1 forwards its I/O task requests 550-2 to arbitrator resource 140-2. Arbitrator resource 140-2 stores the submitted I/O task requests 550-2 from application 196-1 in queue 520-2. Arbitrator resource 140-2 includes time consumption tracker 540-2. As its name suggests, time consumption tracker 540-2 keeps track of time consumed by storage resource 110-1 to execute tasks 550-2 submitted by application 196-1 to storage resource 110-1. Consumption occurs between a time of submitting a task and a time of receiving notification that the task has been completed.

As further discussed below, arbitrator resource 140-1 and arbitrator resource 140-2 selectively forward the I/O task requests 550-1 and 550-2 to the storage resource 110-1 for execution such that 75% of processing time (or capacity) associated with storage resource 110-1 is used to execute tasks 550-1 and 25% is used to execute tasks 550-2 in accordance with access metrics 145.

Figure 6:
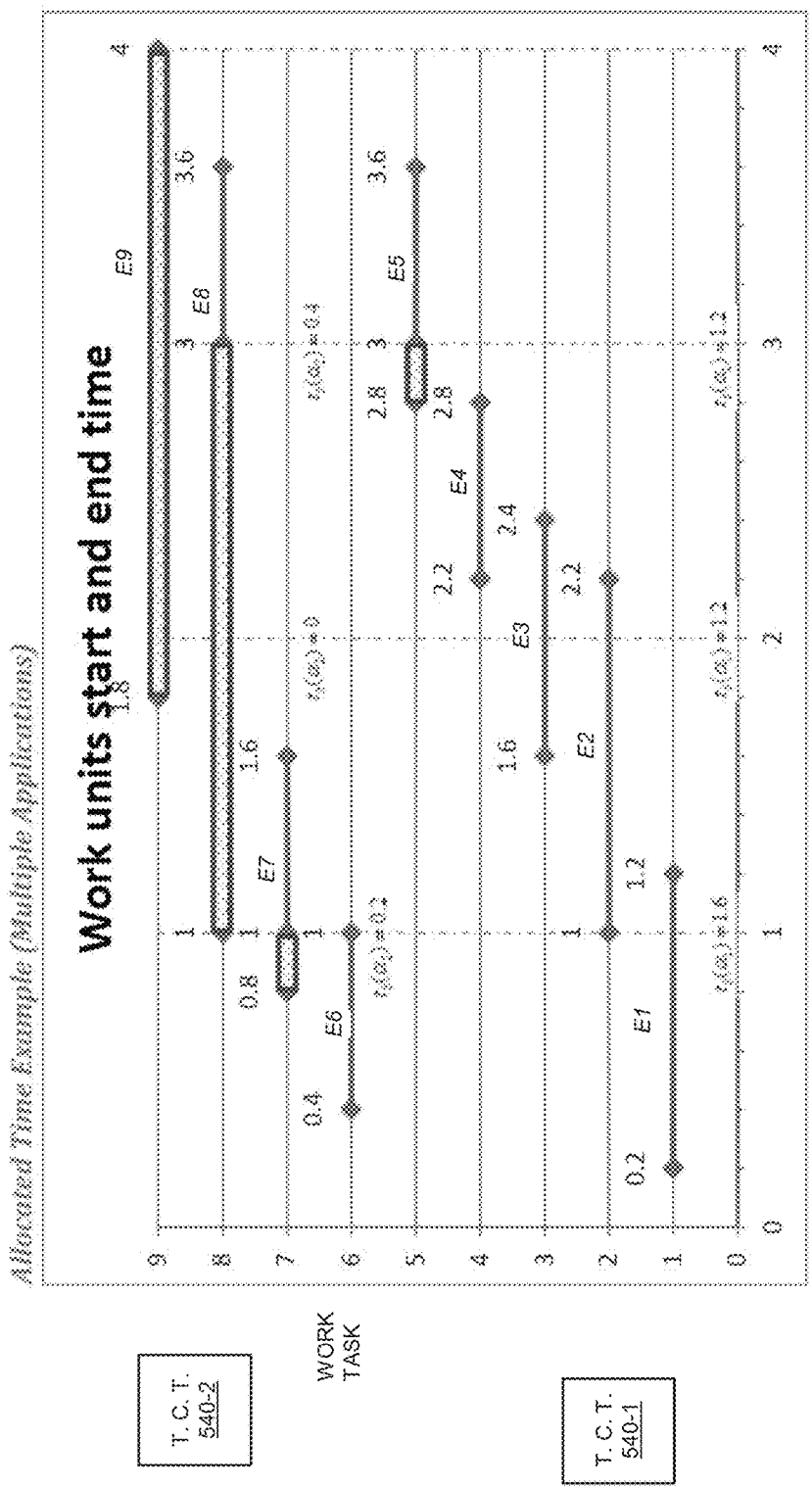
FIG. 6 is an example diagram illustrating time consumption tracking and arbitration of executing work tasks for each of multiple applications according to embodiments herein.

FIG. 6 is an example diagram illustrating time consumption tracking and arbitration of executing work tasks for each of multiple applications according to embodiments herein.

This example illustrates how the allocated time affects multiple applications. Let's assume we have two applications competing to submit I/O task requests to the storage resource 110-1: $\alpha_1$ (such as application 195-1) and $\alpha_2$ (such as application 196-1), where $t_a(\alpha_1)=1.2$ and $t_a(\alpha_2)=0.4$. This means that application 195-1 is allocated (1.2/[1.2+0.4]) 75% of available processing time such as approximately 1.6 processing units associated with storage resource 110-1; application 196-1 is allocated (0.4/[1.2+0.4]) 25% of the available processing time associated with storage resource 110-1.

Note that the total amount of available processing time associated with a respective resource may vary over time.

The values for time balance values $t_b$ in the chart above are at the end of each interval, after adding the corresponding $t_a$. Also initially we have $t_b=t_a$ for each application.

More specifically, assume that $\alpha_1$ (application 195-1) generates $\epsilon_1$ to $\epsilon_5$ in FIG. 6 and $\alpha_2$ (application 196-1) generates $\epsilon_6$ to $\epsilon_8$ in FIG. 6 for submission to storage resource 110-1. Applying similar calculations for each application, it is evident that the work unit of $\alpha_1$ (allotted 75% usage of storage resource 110-1) will be passed for execution to the work processor of storage resource 110-1 much sooner. Also in interval $i_3$, the work processor executes work units exclusively for $\alpha_1$ which gives makes it more likely that the processor will complete them sooner. Application $\alpha_1$ is also able to start and complete an additional WU in the same time frame because of the processor availability. When there is no competition such as over usage of the storage resource's processing capacity to execute I/O task requests, the arbitrator resources do not limit submission of respective I/O task requests to the appropriate storage resource. In this example embodiment, I/O task requests associated with application $\alpha_2$ will probably not start new work units until the ones already started have completed.

In accordance with further specific embodiments, assume that the arbitrator resource 140-1 and arbitrator resource 140-2 control submission of I/O task requests from respective applications 195-1 and application 196-1 to storage resource 110-1 for execution. At time 0.0, assume that time value $t_a$ (application 195-1)=1.2 and time value $t_a$ (application 196-1)=0.4. In this manner, the application 195-1 is allocated 1.2 additional work units for each new time segment while the application 196-1 is allocated 0.4 additional work units for each new time segment.

In one embodiment, the arbitrator resources add the additional time to the respective time balance values $t_b$ at integer time values such as 1.0, 2.0, 3.0, etc.

Further in this example embodiment, the arbitrator resource 140-1 includes time consumption tracker 540-1 to track consumption by application 195-1 that generates I/O task requests E1, E2, E3, E4, and E5; arbitrator resource 140-2 includes time consumption tracker 540-2 to track consumption by application 196-1 that generates I/O task requests E6, E7, and E8.

As previously mentioned, at time 0.0, assume that the time consumption tracker 540-1 sets $t_b$ for application 195-1=TB(appn 195-1)=1.2. Because there is no usage between time 0.0 to 0.2, the value of TB(appn 195-1)=1.2 at time 0.2. At time 0.2, the arbitrator resource 140-1 receives respective task E1 from application 195-1 for execution by storage resource 110-1. Because the magnitude of TB(appn 195-1)=1.2 is greater than 0 at time 0.2, the arbitrator resource 140-1 submits the task E1 to storage resource 110-1. Just before time=1.0, the TB(appn 195-1)=0.4 because execution of task E1 reduces TB(appn 195-1) by 0.8 units. At time 1.0, the arbitrator resource 140-1 adds the value 1.2 to the TB(appn 195-1) to produce a value of 1.6.

At time 1.0, the arbitrator resource 140-1 receives respective task E2 from application 195-1 for execution by storage resource 110-1. Because the magnitude of TB(appn 195-1)=1.6 is greater than 0 at time 1.0 when task E2 is received at time 1.0, the arbitrator resource 140-1 submits the task E2 to storage resource 110-1.

At time 1.2, because tasks E1 and E2 were previously executing, the value TB(appn 195-1)=0.8 because each of tasks E1 and E2 consume 0.2 units of time between time 1.0 and time 1.2.

At time 1.6, the value of TB(appn 195-1)=0.8 because tasks E2 consumed 0.4 units of time between time 1.2 and time 1.6. Arbitrator resource 140-1 receives task E3 at time 1.6. Because TB(appn 195-1)=0.8 and is greater than zero, the arbitrator resource 140-1 submits task E3 to storage resource 110-1 for execution. Between time 1.6 and 2.0, the storage resource 110-1 executes both tasks E2 and E3. Just before time=2.0, the time balance value TB(appn 195-1)=0.0 because execution of task E2 and E3 reduces TB(appn 195-1) by 0.8 units. At time 2.0, the arbitrator resource 140-1 adds the value 1.2 to TB(appn 195-1) to produce a value of TB(appn 195-1)=1.2.

At time 2.0, two tasks E2 and E3 are still pending. At time 2.2, the arbitrator resource 140-1 receives respective task E4 from application 195-1 for execution by storage resource 110-1. The arbitrator resource 140-1 receives notification that storage resource 110-1 completes execution of task E2. At time 2.2, the magnitude of TB(appn 196-1)=0.8 because of consumption by pending tasks E2 and E3. Because the magnitude of TB(appn 196-1)=0.8 is greater than 0 at time 2.2 when task E4 is received, the arbitrator resource 140-1 also submits the task E4 to storage resource 110-1. Tasks E3 and E4 are pending between time 2.2 and 2.4. At time 2.4, because tasks E3 and E4 were being processed simultaneously, the value TB(appn 195-1) reduces to 0.4 because each of tasks E3 and E4 consume 0.2 units of time between time 2.2 and time 2.4.

At subsequent time 2.8, the value of TB(appn 195-1)=0.0 because tasks E4 consumes 0.4 units of time between time 2.4 and 2.8. As shown, arbitrator resource 140-1 receives task E5 at time 2.8. Because TB(appn 196-1)=0.0 at time 2.8 is not greater than zero, the arbitrator resource 140-1 does not submit received task E5 to storage resource 110-1. The arbitrator resource 140-1 receives notification at time 2.8 that the task E4 has completed. Between time 2.8 and just before time 3.0, the value of TB(appn 195-1)=0.0. At time 3.0, the arbitrator resource 140-1 adds the value 1.2 to the TB(appn 195-1) to produce a value of TB(appn 196-1)=1.2. Because the value TB(appn 195-1)=1.2 is greater than zero at time 3.0, the arbitrator resource 140-1 submits task E5 to storage resource 110-1 for execution.

In this manner, the arbitrator resource 140-1 limits the application 195-1 to consumption of storage resource's 110-1 processing time in accordance with the first time consumption apportionment value (75%). Because the application 195-1 and/or user 108-1 is allocated 1.2 units per time segment, the arbitrator resource 140-1 allows submission of up to 2 (the next highest integer value greater than 1.2) simultaneous tasks generated by application 195-1 to storage resource 110-1.

Recall that application 196-1 is allocated a second time consumption apportionment value (25%) of storage resource's 110-1 processing time. At the same time that arbitrator resource 140-1 limits submission of tasks by application 195-1, arbitrator resource 140-2 limits submission of tasks by application 196-1 to storage resource 110-1.

More specifically, the arbitrator resource 140-2 includes time consumption tracker 540-2 to track consumption by application 196-1 that generates I/O task requests E6, E7, E8, and E9.

At time 0.0, assume that the time consumption tracker 540-2 sets $t_b$ for application 196-1=TB(appn 196-1)=0.4. Because there is no usage between time 0.0 to 0.4, the value of TB(appn 196-1)=0.4 at time 0.4.

As shown, at time 0.4, the arbitrator resource 140-2 receives respective task E6 from application 196-1 for execution by storage resource 110-1. At time 0.8, the magnitude of TB(appn 196-1)=0.0 because 0.4 units are consumed between time 0.4 and 0.8. Because the magnitude of TB(appn 196-1)=0.0 is not greater than 0 at time 0.8, the arbitrator resource 140-2 does not submit the newly received task E7 to storage resource 110-1.

Just before time=1.0, the time TB(appn 196-1)=−0.2 because execution of task E6 reduces TB(appn 195-1) by 0.6 units. At time 1.0, the arbitrator resource 140-2 adds the value 0.4 to the TB(appn 195-1) to produce a value of +0.2. The arbitrator resource 140-2 receives notification from storage resource 110-1 that task E6 is completed at time 1.0.

At time 1.0, the arbitrator resource 140-1 receives respective task E8 from application 196-1 for execution by storage resource 110-1. Tasks E7 and E8 are stored in queue 520-2. Because the magnitude of TB(appn 196-1)=+0.2 is greater than 0 at time 1.0 and task E7 is available for submission, the arbitrator resource 140-1 submits the task E7 to storage resource 110-1 at time 1.0. Thus, the arbitrator resource 140-2 delays submission of task E7 by 0.2 units.

At time 1.6, because task E7 was forwarded to storage resource 110-1 for execution, the value TB(appn 195-1) falls to −0.4 because task E7 consume 0.6 units of time between time 1.0 and time 1.6. At time 1.6, because the value of TB(appn 195-1)=−0.4 is not greater than zero, the arbitrator resource 140-2 continues to delay submission of task E8 to storage resource 110-1.

Arbitrator resource 140-2 receives task E9 at time 1.8. Because TB(appn 196-1)=−0.4 and is not greater than zero, the arbitrator resource 140-2 does not submit task E8 or E9 to storage resource 110-1.

At time 2.0, the arbitrator resource 140-2 adds 0.4 to the current value of TB(appn 196-1) such that TB(appn 196-1) =0.0. Because the value TB(appn 196-1) is not greater than zero at time 2.0, the arbitrator resource 140-2 does not submit any tasks generated by application 196-1 to the storage resource 110-1.

At time 3.0, the arbitrator resource 140-2 adds 0.4 to the current value of TB(appn 196-1) such that TB(appn 196-1) =0.4. Because the value TB(appn 196-1) is greater than zero at time 3.0, the arbitrator resource 140-2 submits next task E8 to storage resource 110-1 for execution. The arbitrator resource 140-2 continues to delay submission of task E9 to storage resource 110-1 for execution.

At time 3.6, because task E8 was pending execution via storage resource 110-1, the value TB(appn 195-1) falls to −0.2 because task E8 consumed 0.6 units of time between time 3.0 and time 3.6. At time 3.6, because the value of TB(appn 195-1)=−0.2 is not greater than zero, the arbitrator resource 140-2 continues to delay submission of task E9 to storage resource 110-1.

At time 4.0, the arbitrator resource 140-2 adds 0.4 to the current value of TB(appn 196-1) such that TB(appn 196-1) =0.2. Because the value TB(appn 196-1) is greater than zero at time 4.0, the arbitrator resource 140-2 submits next task E9 to storage resource 110-1 for execution.

In this manner, the arbitrator resource 140-2 limits the application 196-1 to consumption of storage resource's 110-1 time to execute tasks on behalf of application 196-1 in accordance with a first time consumption apportionment value (25%). Because the application 196-1 and/or user 108-2 is allocated 0.4 units per time segment, the arbitrator resource 140-1 allows submission of up to 1 (the next highest integer value greater than 0.4) simultaneous task generated by application 195-1 to storage resource 110-1.

Detecting Workload Change and Performing Time Redistribution

Each arbitrator resource performs workload checks on a regular basis as previously discussed. For each application, another value previous average interval consumed time ($\tilde{t}_{avg}$) is preserved. During a workload check, for each application $t_{avg}(\alpha)$ is compared against $t_{avg}(\alpha)$ for the last interval. The arbiter will initiate a time distribution when the two values differ by a certain threshold (e.g. 10%). Each workload check will also update $\tilde{t}_{avg}(\alpha)$ with the current value of $t_{avg}(\alpha)$ in order to prepare for the next workload check.

To perform time redistribution, the arbiter uses a more detailed version of the time distribution formula:

$$t_a(\alpha) = \frac{p^*(\alpha)}{\sum_{\alpha \in A} p^*(\alpha)} \times \sum_{\alpha \in A} t_{avg}(\alpha) \times X.$$

Where $$p^*(\alpha) = \min\left\{p(\alpha), \frac{p(\alpha) \times t_{avg}(\alpha)}{\min[\mu, t_a(\alpha)]}\right\}.$$

It is evident from the formula that the arbiter takes into account the current workload for each application. The adjusted application points $p^*(\alpha)$ take into account the efficiency with which an application utilizes its allocated time $t_a(\alpha)$. This ensures a more efficient time distribution and thus more efficient work processor utilization. Applications which under-performed since the last workload check (i.e. $t_{avg}(\alpha) < \min[\mu, t_a(\alpha)]$) will participate with fewer than their user-assigned application points in the time distribution formula. This way the arbiter is able to redistribute unused time to other applications, which might need it.

The adaptive growth factor X,1<X<2 is a modifier used to expand the total time available for distribution in order to accommodate for changes in the work processor's processing speed. The work processor's speed may fluctuate in time. E.g. for a certain period of time it may be able to process less work and later its processing speed may increase. If time distribution is calculated for a period with decreased work processing speed, $t_a(\alpha)$ calculated for each application would not be adequate for a period with increased processing speed. The applications would be limited by the arbiter according to their $t_a(\alpha)$ and the work processor would not be fully utilized. The adaptive growth factor allows the arbiter to adapt to an increase in the work processor's speed.

Figure 7:
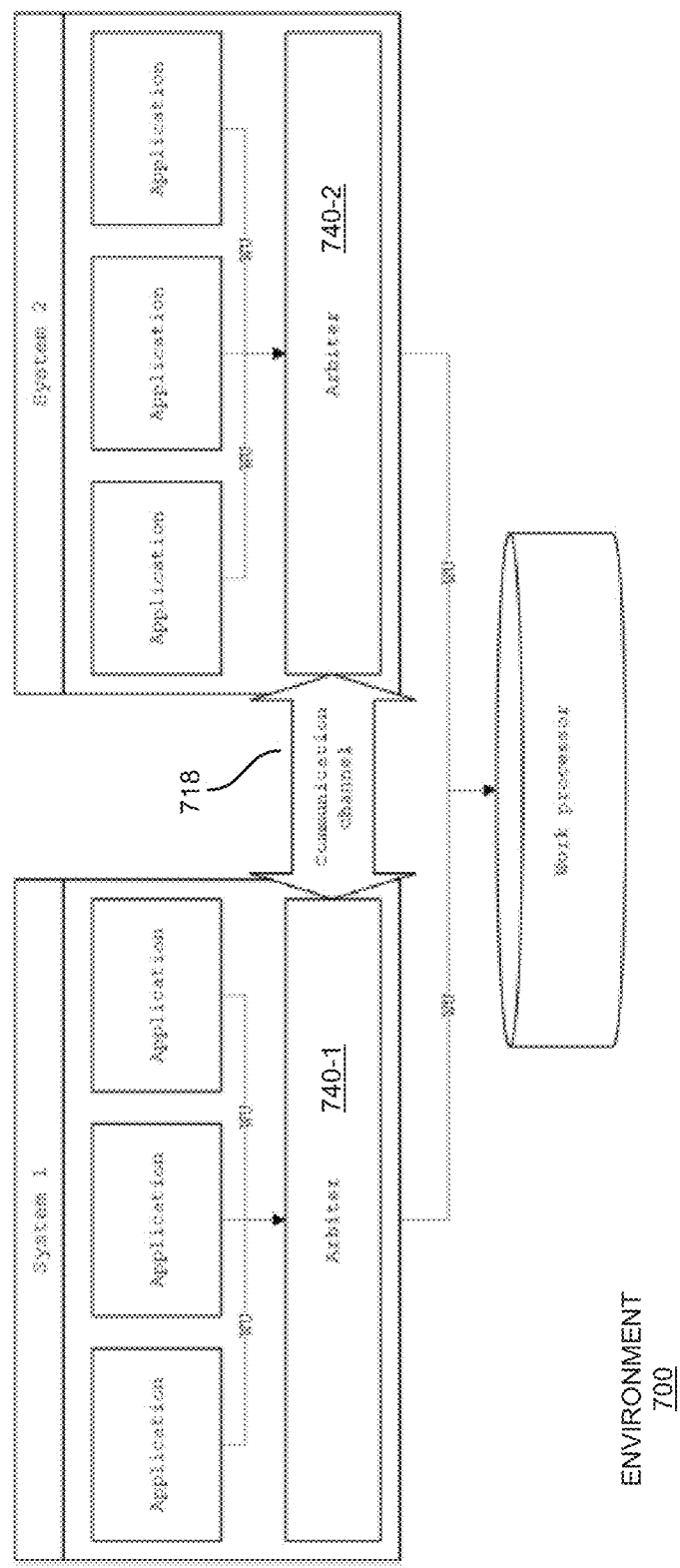
FIG. 7 is an example diagram illustrating a distributed arbiter according to embodiments herein.

FIG. 7 is an example diagram illustrating a distributed arbiter according to embodiments herein.

Multi-Arbiter Interaction

In a multi-system environment 700, where the systems 1 and 2 have similar applications and work with a common work processor, implementations of arbiters 740 (such as arbiter 740-1 and arbiter 740-2) can provide inter-system arbitration, provided that a communication channel 718 is available between the systems for use by the arbiters 740.

During the regular workload checks described in the previous section, each arbiter computes:

$$T_{avg} = \sum_{\alpha \in A} t_{avg}(\alpha) \text{ and } P = \sum_{\alpha \in A} p(\alpha)$$

Then using the communication channel the arbiter sends the pair of values $\langle T_{avg}, P \rangle$ to the other arbiters in the environment. Each arbiter keeps a list of $\langle T_{avg}, P \rangle$ pairs received from the external arbiters. When time redistribution has to be performed, the arbiter uses the data received from external arbiters in the modified time distribution formula:

$$t_a(\alpha) = \frac{p^*(\alpha)}{\sum_{\alpha \in A} p^*(\alpha) + \sum_{external} P} \times \left[\sum_{\alpha \in A} t_{avg}(\alpha) + \sum_{external} T_{avg}\right] \times X$$

It is evident that workload from any application in any system is influential to the time distribution of the rest of the applications in the other systems.

Figure 8:
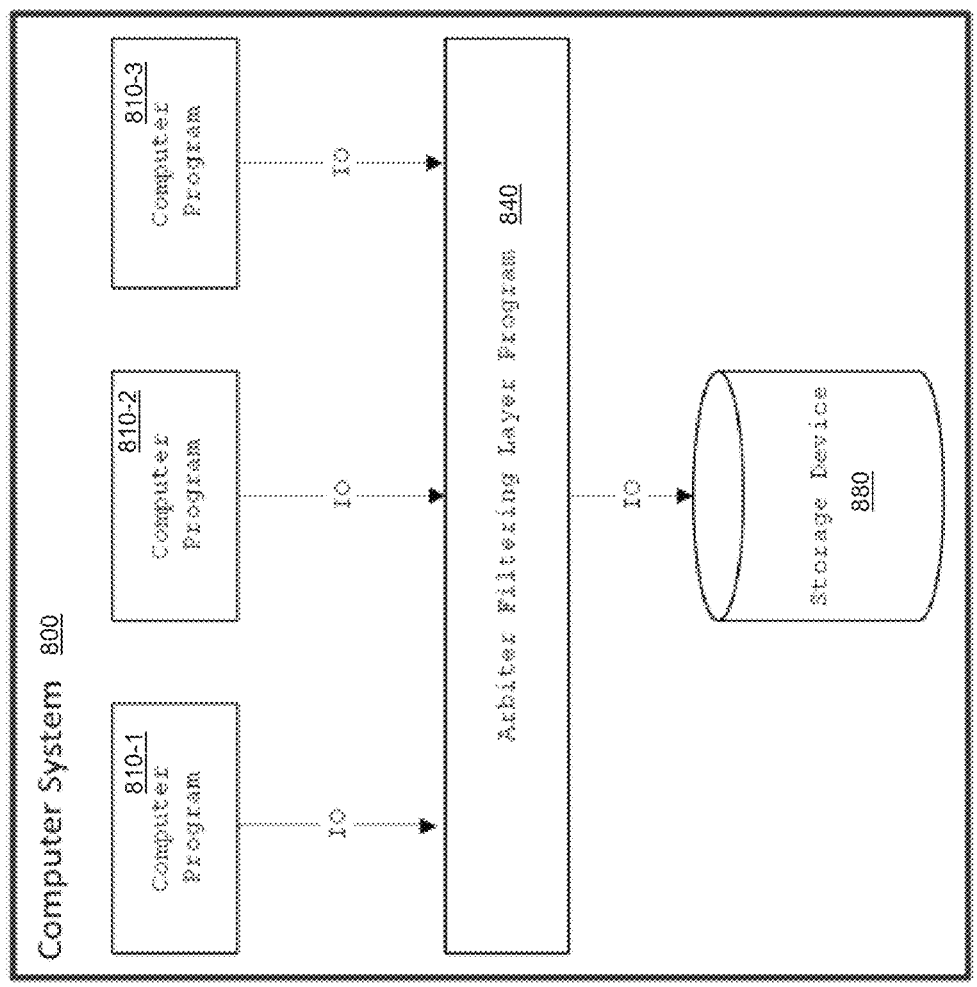
FIG. 8 is an example diagram illustrating a computer system implementing arbitration according to embodiments herein.

FIG. 8 is an example diagram illustrating a computer system implementing arbitration according to embodiments herein.

Storage Device Input/Output Requests Arbiter

Figure 9:
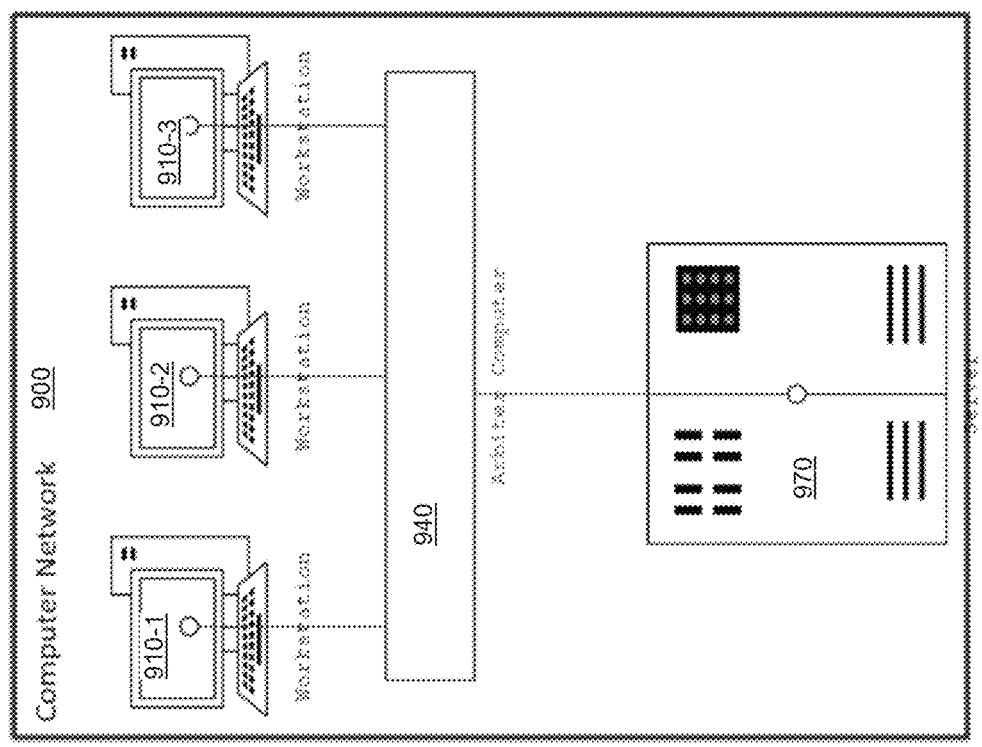
FIG. 9 is an example diagram illustrating a computer network implementing arbitration according to embodiments herein.

In computer system 800, arbitrated access to a storage device 880 (physically present in the system or attached to the computer system 800) could be provided by implementing a filtering layer program 840 which arbitrates Input/output (IO) requests from computer programs 810 (such as computer program 810-1, computer program 810-2, computer program 810-3) operating inside the computer system 800. In this particular implementation, the abstract terms used above translate to the method application as follows:

Application=Computer Program
Work unit (WU)=Input/Output request (IO request)
Arbiter=I/O requests intercepting layer program attached to the storage device interface layer (device driver).
Work processor=Storage device FIG. 9 is an example diagram illustrating a computer network implementing arbitration according to embodiments herein.
Client/Server Workload Arbiter In a computer network 900, consisting of client computers (such as workstations 910-1, 910-2, 910-3, etc.) requesting services from a server computer system 970 (one or more servers), workload arbitration could be implemented by dedicating an arbiter filter computer 940 to arbitrate the work requests from the workstations to the server computer system 970.

Figure 10:
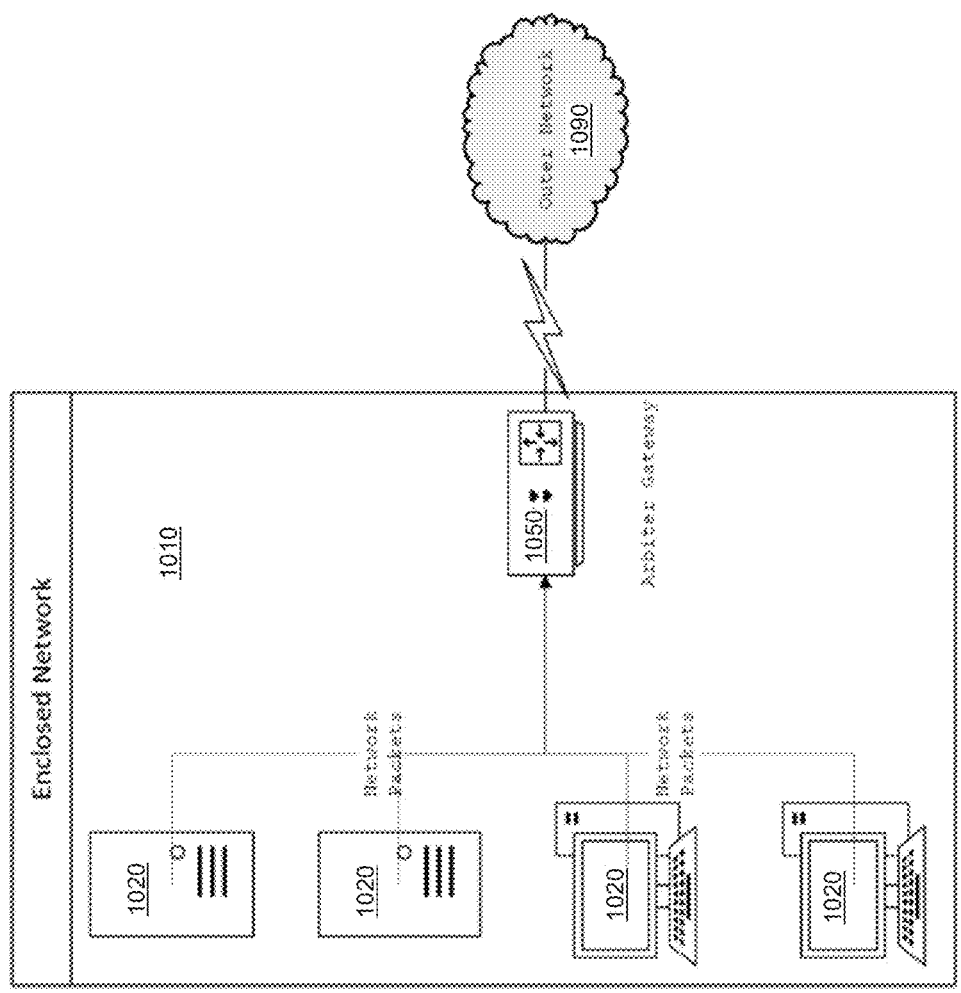
FIG. 10 is an example diagram illustrating an enclosed network implementing arbitration according to embodiments herein.

Application=Workstation
WU=Client/Server work request
Arbiter=Filtering computer equipped with computer program implementation of the arbiter method.
Work processor=Server FIG. 10 is an example diagram illustrating an enclosed network implementing arbitration according to embodiments herein.

In an enclosed computer network 1010 connected to a larger outer computer network 1090, an arbiter gateway unit 1050 implements an arbiter filter as described herein method to provide the computers 1020 arbitrated network traffic control to the outer network 1090. Accordingly, the arbitrator resources as described herein can be used to arbitrate network traffic to one or more resources in network 1090.

Figure 11:
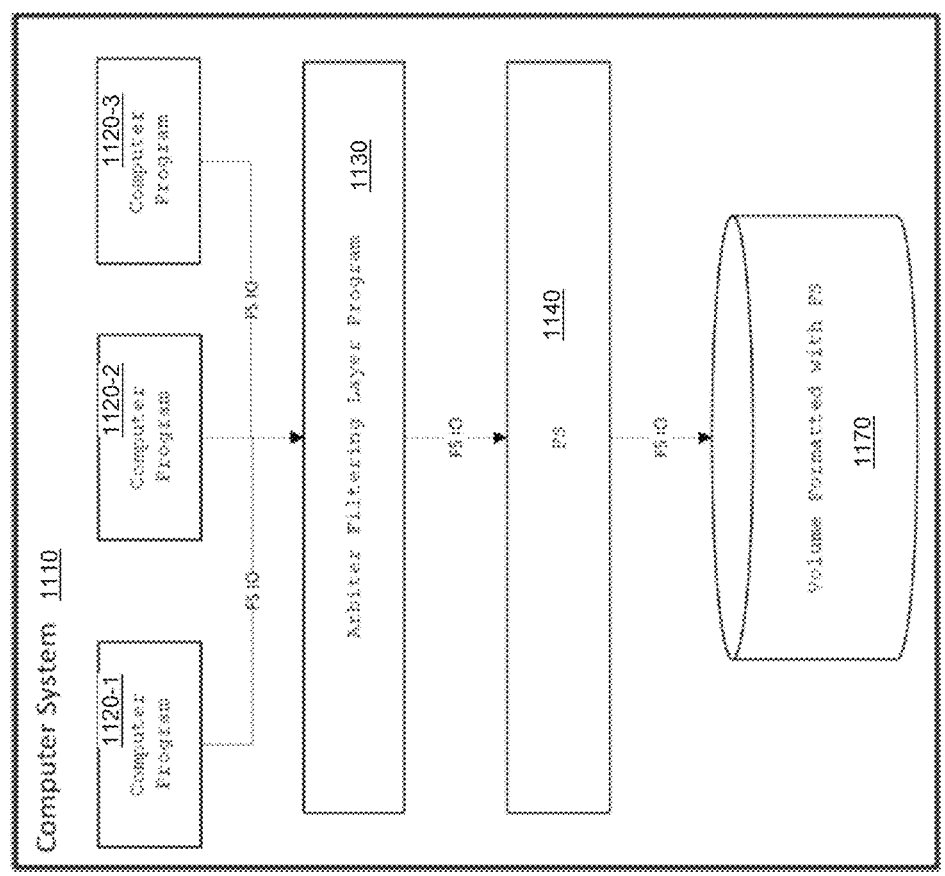
FIG. 11 is an example diagram illustrating a computer system implementing arbitration according to embodiments herein.

Application=Computer attached to the enclosed network
WU=Network packet
Arbiter =Gateway filtering unit
Work processor=Outer computer network FIG. 11 is an example diagram illustrating a computer system implementing arbitration according to embodiments herein.

In a computer system 1110, arbiter filtering layer program 1130 provides computer programs 1120 (computer program 1120-1, computer program 1120-2, computer programmer 1120-3, . . . ) arbitrated access to a volume 1170 formatted with a file system 1140 (FS). The arbiter filtering layer program 1130 intercepts FS IO requests from computer programs 1120 to volume 1170.

Figure 12:
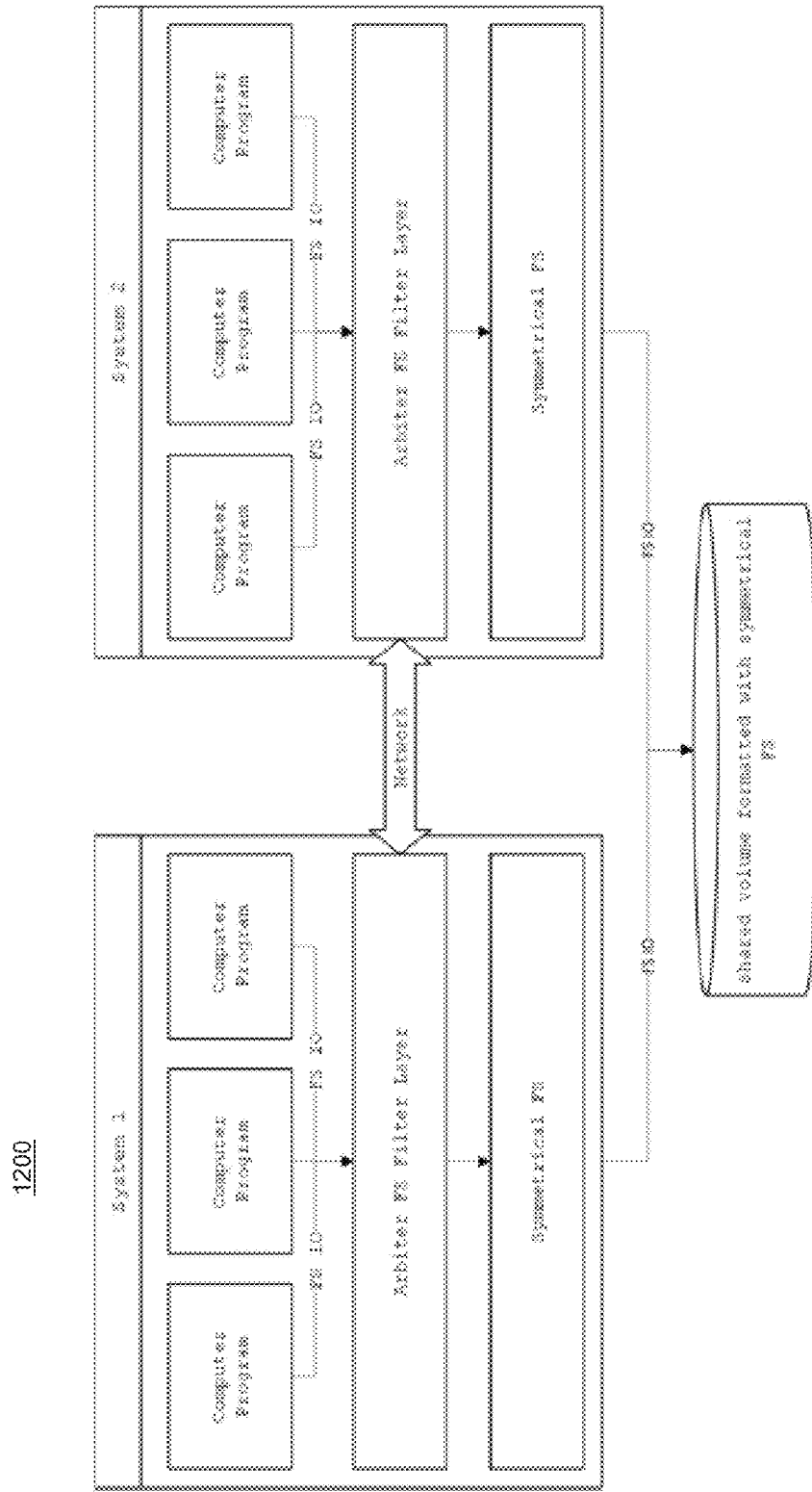
FIG. 12 is an example diagram illustrating a system according to embodiments herein.

Application=Computer program
WU=FS IO request
Arbiter=FS filter layer program
Work processor=Volume device formatted with a certain FS FIG. 12 is an example diagram illustrating an arbitration system according to embodiments herein.

In a computer cluster 1200 consisting of multiple computer systems 1 and 2, embodiments herein include a symmetrical FS and a shared volume device formatted with the symmetrical FS, associated with arbitration using multi-arbiter interaction over a network communications channel.

Figure 13:
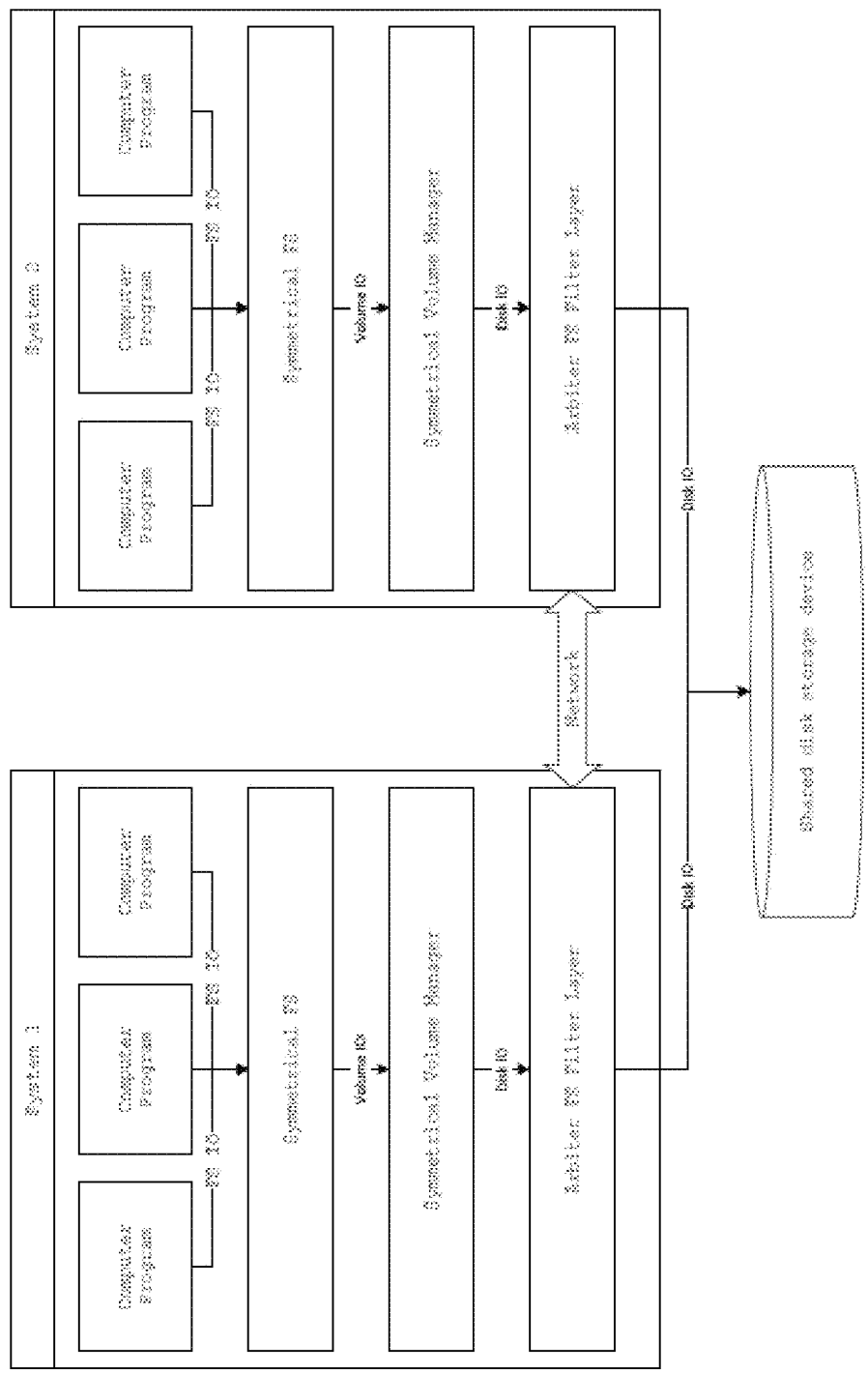
FIG. 13 is an example diagram illustrating an arbitration system according to embodiments herein.

FIG. 13 is an example diagram illustrating an arbitration system according to embodiments herein.

In a computer cluster consisting of multiple computer systems 1 and 2, embodiments herein include a symmetrical FS and a shared volume device, provided by a symmetrical volume manager and formatted with the symmetrical FS, as well as arbitration using multi-arbiter interaction over a network communications channel.

Figure 14:
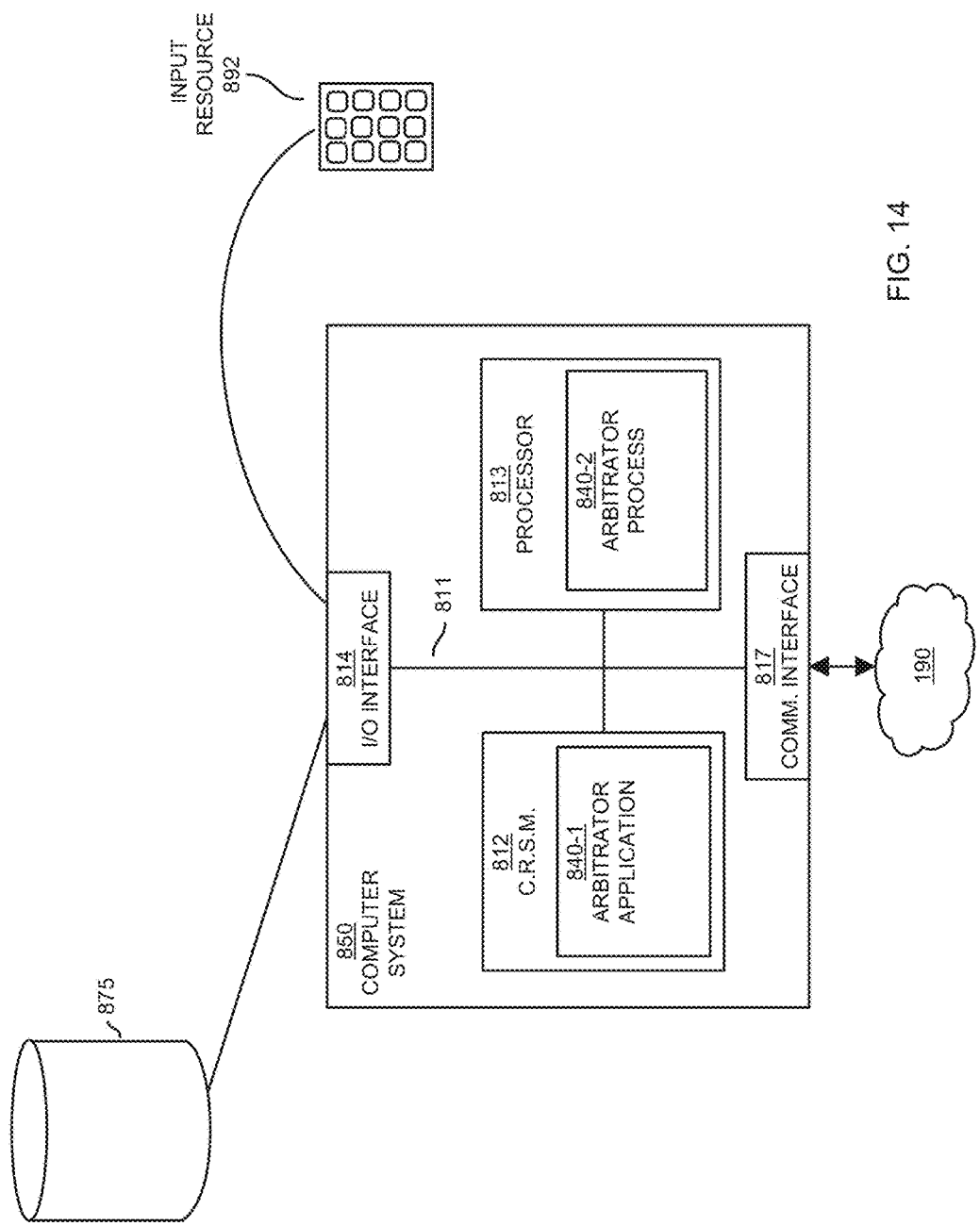
FIG. 14 is a diagram illustrating an example computer architecture in which to execute any of the functionality according to embodiments herein.

FIG. 14 is a diagram illustrating an example computer architecture in which to execute any of the functionality as described herein. Any of the different processing techniques can be implemented via execution of software code on computer processor hardware.

For example, as shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Computer processor hardware (i.e., processor 813) can be located in a single location or can be distributed amongst multiple locations.

As its name suggests, I/O interface 814 provides connectivity to resources such as repository 875, control devices (such as controller 892), one or more display screens, etc.

Computer readable storage medium 812 can be any hardware storage device to store data such as memory, optical storage, hard drive, floppy disk, etc. In one embodiment, the computer readable storage medium 812 stores instructions and/or data.

Communications interface 817 enables the computer system 850 and processor resource 813 to communicate over a resource such as any of networks 190. I/O interface 814 enables processor resource 513 to access data from a local or remote location, control a respective display screen, receive input, etc.

As shown, computer readable storage media 512 can be encoded with arbitrator application 840-1 (e.g., software, firmware, etc.) executed by processor 813. Arbitrator application 840-1 can be configured to include instructions to implement any of the operations as discussed herein associated with one or more arbitrator resources 140.

During operation of one embodiment, processor 813 accesses computer readable storage media 812 via the use of interconnect 811 in order to launch, run, execute, interpret or otherwise perform the instructions in arbitrator application 840-1 stored on computer readable storage medium 812.

Execution of the arbitrator application 840-1 produces processing functionality such as arbitrator process 840-2 in processor resource 513. In other words, the arbitrator process 840-2 associated with processor resource 813 represents one or more aspects of executing arbitrator application 840-1 within or upon the processor resource 813 in the computer system 850.

Those skilled in the art will understand that the computer system 850 can include other processes and/or software and hardware components, such as an operating system that controls allocation and use of hardware resources to execute arbitrator application 840-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement functionality as discussed herein.

Figure 15:
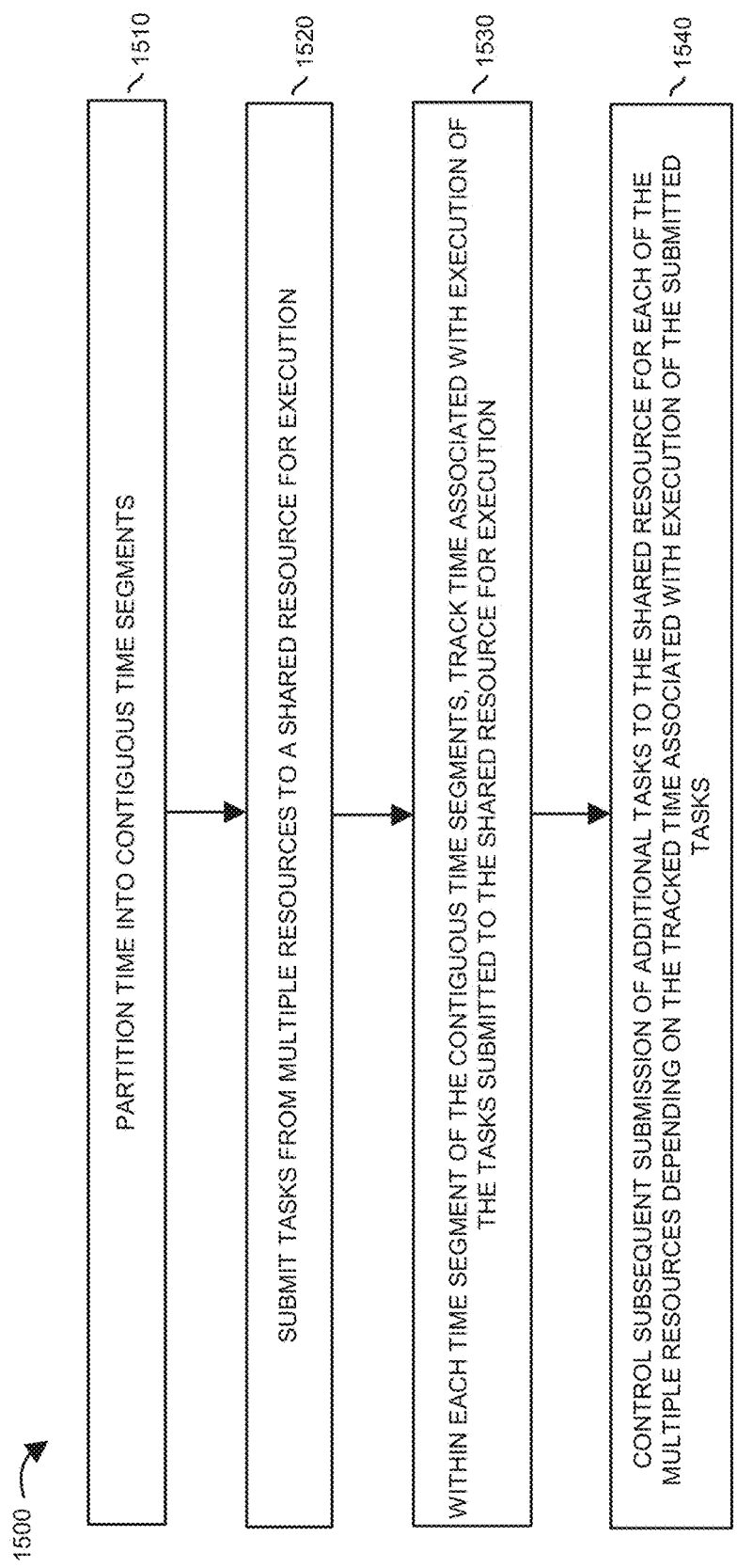
FIG. 15 is an example diagram illustrating a method of arbitrating use of a shared resource according to embodiments herein.

FIG. 15 is a flowchart 1500 illustrating an example method according to embodiments. Note that there will be some overlap with respect to concepts as discussed above.

In processing block 1510, the arbitrator resource 140 (such as arbitrator resource 140-1, arbitrator resource 140-2, etc.) partitions time into contiguous time segments.

In processing block 1520, the arbitrator resource 140 submits tasks from multiple resources (such as applications 195-1 and applications 196-1) to a shared resource (storage resource 110-1) for execution.

In processing block 1530, within each time segment of the contiguous time segments, the arbitrator resource 140 tracks time associated with execution of the different tasks submitted to the shared resource for execution.

In processing block 1540, the arbitrator resource 140 controls subsequent submission of additional tasks to the shared resource for each of the multiple resources depending on the tracked time associated with execution of the submitted tasks.

Note again that techniques herein are well suited for providing controlled access to a shared resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   partitioning time into contiguous time segments;
   submitting tasks from multiple resources to a shared resource for execution;
   within each time segment of the contiguous time segments, tracking time associated with execution of the tasks submitted to the shared resource for execution, wherein the tracking calculates an amount of time consumed by each one of the tasks executed during each one of the contiguous time segments, and wherein the tracking further includes i) tracking consumption of time for execution of tasks submitted to the shared resource on behalf of a first resource of the multiple resources and generated by the first resource, and ii) tracking consumption of time for execution of tasks submitted to the shared resource on behalf of a second resource of the multiple resources and generated by the second resource;
   controlling subsequent submission of additional tasks to the shared resource for each of the multiple resources depending on the tracked time associated with execution of the submitted tasks, wherein controlling subsequent submission of tasks for each of the multiple resources to the shared resource includes i) in a first time segment, analyzing consumption of time for execution of tasks submitted to the shared resource on behalf of the first resource and generated by the first resource, and analyzing consumption of time for execution of tasks submitted to the shared resource on behalf of the second resource and generated by the second resource, and ii) for a second time segment following the first time segment, adjusting the subsequent submission of tasks in accordance with a first apportionment value for the first resource and a second apportionment value for the second resource.

2. The method as in claim 1 further comprising:
   retrieving a first metric, the first metric assigned to the first resource;
   retrieving a second metric, the second metric assigned to the second resource;
   normalizing the first metric and the second metric; and
   based on normalizing the first metric and the second metric, producing the first apportionment value for the first resource and the second apportionment value for the second resource.

3. The method as in claim 1, wherein adjusting the subsequent submission of tasks further comprises:
   limiting a number of parallel tasks that each of the first resource and second resource submit are able to submit in the second time segment such that the first resource and the second resource are provided use to the shared resource as specified by the first apportionment value and the second apportionment value.

4. The method as in claim 3, wherein adjusting the subsequent submission of tasks further comprises:

delaying at least one task generated by the first resource and submitted to the shared resource in the second time segment to reduce an amount of time associated with execution of tasks generated by the first resource in the second time segment.

5. The method as in claim 3, wherein limiting the number of parallel tasks includes:
producing a first control metric, the first control metric specifying a maximum number of tasks generated by the first resource that can be submitted for parallel execution to the storage resource in the first time segment; and
producing a second control metric, the second control metric specifying a maximum number of tasks generated by the second resource that can be submitted for parallel execution in the first time segment; and
adjusting magnitudes of the first control metric and the second control metric to facilitate usage of the shared resource by the first resource and the second resource in a manner as specified by the first apportionment value and the second apportionment value.

6. The method as in claim 1, wherein each of the contiguous time segments is substantially equal in time duration; and
wherein the tasks submitted to the shared resource are I/O processing tasks with respect to data stored in the shared resource.

7. The method as in claim 1, wherein the tasks submitted to the shared resource for execution include a first set of tasks generated by a first resource and a second set of tasks generated by a second resource, the first set of tasks submitted on behalf of the first resource for parallel execution by the shared resource, the second set of tasks submitted on behalf of the second resource for parallel execution by the shared resource.

8. The method as in claim 1, wherein tracking time associated with the execution of tasks submitted to the shared resource for execution includes:
for the first resource, producing a first value representing a summation of execution time in the first time segment for each of multiple tasks generated by the first resource that are submitted in the first time segment to the shared resource for parallel execution; and
for the second resource, producing a second value representing a summation of execution time in the second time segment for each of multiple tasks generated by the second resource that are submitted in the first time segment to the shared resource for parallel execution.

9. The method as in claim 1, wherein tracking time associated with the execution of tasks submitted to the shared resource for execution includes:
for each respective task of the submitted tasks: i) tracking a start time of submitting the respective task, and ii) tracking an end time of receiving notification that the respective task has been completed by the shared resource.

10. The method as in claim 1, wherein tracking time associated with the execution of tasks submitted to the shared resource for execution includes:
tracking a start time and end time of a first task generated by the first resource, an elapsed time between the start time of the first task and the end time of the first task representing a first duration;
tracking a start time and end time of a second task generated by the first resource, the second task submitted in parallel with the first task, an elapsed time between the start time of the second task and the end time of the second task representing a second duration, the second duration at least partially overlapping with the first duration; and
summing a portion of the first duration and a portion of the second duration that resides within a first time segment to track the first resource's usage of the shared resource in the first time segment.

11. A system comprising:
computer processor hardware; and
a hardware storage resource coupled to communicate with the computer processor hardware, the hardware storage resource storing instructions that, when executed by the computer processor hardware, causes the computer processor hardware to perform operations of:
partitioning time into contiguous time segments;
submitting tasks from multiple resources to a shared resource for execution;
within each time segment of the contiguous time segments, tracking time associated with execution of the tasks submitted to the shared resource for execution, wherein the tracking calculates an amount of time consumed by each one of the tasks executed during each one of the contiguous time segments, and wherein the tracking further includes i) tracking consumption of time for execution of tasks submitted to the shared resource on behalf of a first resource of the multiple resources and generated by the first resource, and ii) tracking consumption of time for execution of tasks submitted to the shared resource on behalf of a second resource of the multiple resources and generated by the second resource; and
controlling subsequent submission of additional tasks to the shared resource for each of the multiple resources depending on the tracked time associated with execution of the submitted tasks, wherein controlling subsequent submission of tasks for each of the multiple resources to the shared resource includes i) in a first time segment, analyzing consumption of time for execution of tasks submitted to the shared resource on behalf of the first resource and generated by the first resource, and analyzing consumption of time for execution of tasks submitted to the shared resource on behalf of the second resource and generated by the second resource, and ii) for a second time segment following the first time segment, adjusting the subsequent submission of tasks in accordance with a first apportionment value for the first resource and a second apportionment value for the second resource.

12. The computer system as in claim 11, wherein the computer processor hardware further performs operations of:
retrieving a first metric, the first metric assigned to the first resource;
retrieving a second metric, the second metric assigned to the second resource;
normalizing the first metric and the second metric; and
based on normalizing the first metric and the second metric, producing the first apportionment value for the first resource and the second apportionment value for the second resource.

13. The computer system as in claim 11, wherein adjusting the subsequent submission of tasks further comprises:
limiting a number of parallel tasks that each of the first resource and second resource submit are able to submit in the second time segment such that the first resource and the second resource are provided use to the shared resource as specified by the first apportionment value and the second apportionment value.

14. The computer system as in claim 13, wherein adjusting the subsequent submission of tasks further comprises:
delaying at least one task generated by the first resource and submitted to the shared resource in the second time segment to reduce an amount of time associated with execution of tasks generated by the first resource in the second time segment.

15. The computer system as in claim 14, wherein limiting the number of parallel tasks includes:
producing a first control metric, the first control metric specifying a maximum number of tasks generated by the first resource that can be submitted for parallel execution to the storage resource in the first time segment; and
producing a second control metric, the second control metric specifying a maximum number of tasks generated by the second resource that can be submitted for parallel execution in the first time segment; and
adjusting magnitudes of the first control metric and the second control metric to facilitate usage of the shared resource by the first resource and the second resource in a manner as specified by the first apportionment value and the second apportionment value.

16. The computer system as in claim 11, wherein each of the contiguous time segments is substantially equal in time duration; and
wherein the tasks submitted to the shared resource are I/O processing tasks with respect to data stored in the shared resource.

17. The computer system as in claim 11, wherein the tasks submitted to the shared resource for execution include a first set of tasks generated by a first resource and a second set of tasks generated by a second resource, the first set of tasks submitted on behalf of the first resource for parallel execution by the shared resource, the second set of tasks submitted on behalf of the second resource for parallel execution by the shared resource.

18. The computer system as in claim 11, wherein tracking time associated with the execution of tasks submitted to the shared resource for execution includes:
for the first resource, producing a first value representing a summation of execution time in the first time segment for each of multiple tasks generated by the first resource that are submitted in the first time segment to the shared resource for parallel execution; and
for the second resource, producing a second value representing a summation of execution time in the second time segment for each of multiple tasks generated by the second resource that are submitted in the first time segment to the shared resource for parallel execution.

19. The computer system as in claim 11, wherein tracking time associated with the execution of tasks submitted to the shared resource for execution includes:
for each respective task of the submitted tasks: i) tracking a start time of submitting the respective task, and ii) tracking an end time of receiving notification that the respective task has been completed by the shared resource.

20. The computer system as in claim 11, wherein tracking time associated with the execution of tasks submitted to the shared resource for execution includes:
tracking a start time and end time of a first task generated by a first resource, an elapsed time between the start time of the first task and the end time of the first task representing a first duration;
tracking a start time and end time of a second task generated by the first resource, the second task submitted in parallel with the first task, an elapsed time between the start time of the second task and the end time of the second task representing a second duration, the second duration at least partially overlapping with the first duration; and
summing a portion of the first duration and a portion of the second duration that resides within a first time segment to track the first resource's usage of the shared resource in the first time segment.

21. Computer-readable hardware storage having instructions stored thereon, the instructions, when carried out by computer processor hardware, causes the computer processor hardware to perform operations of:
partitioning time into contiguous time segments;
submitting tasks from multiple resources to a shared resource for execution;
within each time segment of the contiguous time segments, tracking time associated with execution of the tasks submitted to the shared resource for execution, wherein the tracking calculates an amount of time consumed by each one of the tasks executed during each one of the contiguous time segments, and wherein the tracking further includes i) tracking consumption of time for execution of tasks submitted to the shared resource on behalf of a first resource of the multiple resources and generated by the first resource, and ii) tracking consumption of time for execution of tasks submitted to the shared resource on behalf of a second resource of the multiple resources and generated by the second resource; and
controlling subsequent submission of additional tasks to the shared resource for each of the multiple resources depending on the tracked time associated with execution of the submitted tasks, wherein controlling subsequent submission of tasks for each of the multiple resources to the shared resource includes i) in a first time segment, analyzing consumption of time for execution of tasks submitted to the shared resource on behalf of the first resource and generated by the first resource, and analyzing consumption of time for execution of tasks submitted to the shared resource on behalf of the second resource and generated by the second resource, and ii) for a second time segment following the first time segment, adjusting the subsequent submission of tasks in accordance with a first apportionment value for the first resource and a second apportionment value for the second resource.

* * * * *